(12) United States Patent
Jenkins

(10) Patent No.: US 12,002,002 B1
(45) Date of Patent: Jun. 4, 2024

(54) TRASH ROUTING SYSTEM

(71) Applicant: Andrew David Jenkins, Atlanta, GA (US)

(72) Inventor: Andrew David Jenkins, Atlanta, GA (US)

( * ) Notice: Subject to any disclaimer, the term of this patent is extended or adjusted under 35 U.S.C. 154(b) by 0 days.

(21) Appl. No.: 18/418,236

(22) Filed: Jan. 20, 2024

(51) Int. Cl.
  *G06Q 10/0835* (2023.01)
  *B65F 1/02* (2006.01)
  *B65F 1/16* (2006.01)
  *H04N 7/18* (2006.01)

(52) U.S. Cl.
  CPC ......... *G06Q 10/08355* (2013.01); *B65F 1/02* (2013.01); *B65F 1/16* (2013.01); *B65F 2210/128* (2013.01); *B65F 2210/168* (2013.01); *B65F 2210/172* (2013.01); *H04N 7/188* (2013.01)

(58) Field of Classification Search
  CPC ....... G06Q 10/08355; B65F 1/02; B65F 1/16; B65F 2210/128; B65F 2210/168; B65F 2210/172; H04N 7/188
  See application file for complete search history.

(56) References Cited

U.S. PATENT DOCUMENTS

| | | | | |
|---|---|---|---|---|
| 10,332,197 | B2 * | 6/2019 | Kekalainen | G06Q 10/08 |
| 2017/0086230 | A1 * | 3/2017 | Azevedo | H04L 67/12 |
| 2018/0286250 | A1 * | 10/2018 | Cronin | G06Q 50/12 |
| 2019/0019167 | A1 * | 1/2019 | Candel | B65F 3/14 |
| 2019/0311333 | A1 * | 10/2019 | Kekalainen | H04W 4/38 |
| 2019/0392403 | A1 * | 12/2019 | Rainaldi | G06Q 30/0215 |
| 2021/0188541 | A1 * | 6/2021 | Kurani | B65F 1/14 |
| 2022/0101279 | A1 * | 3/2022 | Anderson | G01S 15/42 |
| 2022/0292979 | A1 * | 9/2022 | Gwon | G08G 1/22 |
| 2022/0396424 | A1 * | 12/2022 | Gwon | B65F 1/14 |
| 2023/0058906 | A1 * | 2/2023 | Jansen | G06F 21/6254 |
| 2023/0162160 | A1 * | 5/2023 | Quraishi | G06Q 10/06313 705/7.23 |
| 2023/0162588 | A1 * | 5/2023 | Keller | B65F 1/14 100/45 |

* cited by examiner

*Primary Examiner* — Hussein Elchanti
(74) *Attorney, Agent, or Firm* — Law Firm of AQ Basit

(57) ABSTRACT

An apparatus includes solar panels. The apparatus includes a battery system. The top surface of the battery system attaches to a bottom surface of the solar panels, and a bottom surface of the battery system has blocks that fit through apertures within the grooves of a dumpster lid. The apparatus includes a sensor system. The sensor system is attached to a bottom surface of the battery system, and a top surface of the sensor system has a corrugated design that fits into the bottom surface of the battery system. The apparatus includes a microprocessor. The microprocessor sends electronic information to a computing device. The electronic information includes one or more electronic images, and distance information between a top surface of garbage within a dumpster and a bottom surface of the sensor system.

12 Claims, 17 Drawing Sheets

| TRUCK ID (1202) | AVAILABLE CAPACITY (1204) | TRUCK TYPE (1206) | NO. OF PICKUPS (1208) | LOCATION (1210) |
|---|---|---|---|---|
| D12 | 10 Tons | All | 2 | 10 Main St |
| C31 | 3 Tons | Recyclable | 5 | Depot |
| U98 | 1 Ton | Biodegradable | 8 | 23 First Ave |
| ● | ● | ● | ● | ● |
| ● | ● | ● | ● | ● |

FIG. 12

| DUMPSTER ID (1302) | DUMPSER SIZE (1304) | DUMPSTER TYPE (1306) | LOCATION (1308) | PERCENT FULL (1310) | HISTORY (1312) |
|---|---|---|---|---|---|
| UY7 | 1 Ton | General | Blue Apartments | 25% | d089x |
| BH7 | 3 Tons | Recyclable | 111 Main Street | 40% | nn89t |
| MJ4 | 5 Tons | Biodegradable | Top Shopping Center | 10% | pp98w |
| ● | ● | ● | ● | ● | ● |
| ● | ● | ● | ● | ● | ● |

TRASH ROUTING SYSTEM

BACKGROUND

Many cities use communal trash dumpsters that allow for a convenient place to deposit trash. This may include dumpsters for various types of trash, such as one dumpster for paper/boxes, another dumpster for plastic and metal, another dumpster for mixed trash, and another dumpster for organics (i.e., food scraps).

As the amount and type of trash placed in a dumpster can vary greatly based on the time and day of the week, determining the optimal intervals between picking up the trash from each dumpster is difficult. As a result, overfill conditions can occur where the there is too much trash for the dumpster and excess trash is left on the street near the dumpster.

To limit the costs and customer service issues associated with cleaning up after overfill events, garbage trucks may be sent with greater frequency so that there is excess safety capacity left in each individual dumpster when the garbage truck removes the trash. While running the garbage trucks may solve overfill problem, it can create excess work for truck crews, create excess wear and tear on the vehicles, add additional vehicle fuel costs, and also require an increase in the size of the vehicle fleet (which results in greater greenhouse gases).

There is currently no system that allows for determining optimal times for picking up trash to prevent overfill issues and to reduce the number of garbage trucks and the associated additional fuel and labor costs.

BRIEF DESCRIPTION OF DRAWINGS

FIGS. 12 and 13 are diagrams of example databases.

DETAILED DESCRIPTION OF PREFERRED EMBODIMENTS

Figure 1:
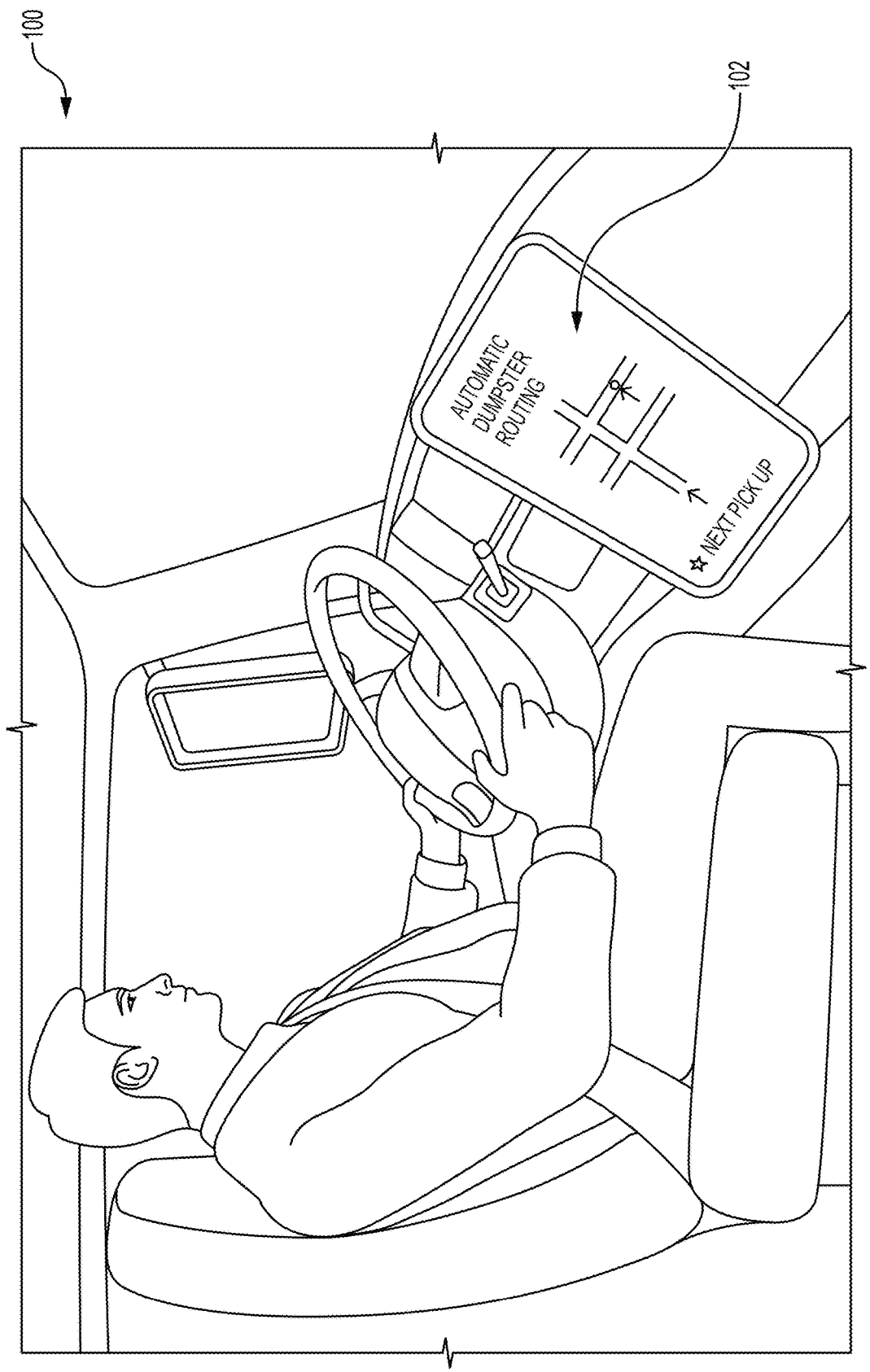
FIG. 1 is a diagram of an example user interface for a garbage pickup system.

The following detailed description refers to the accompanying drawings. The same reference numbers in different drawings may identify the same or similar elements.

Systems, devices, and/or methods described herein may allow for a garbage pickup system that routes vehicles (in particular garbage trucks) to particular garbage dumpster locations at a particular day and time. In embodiments, the systems, devices, and/or methods described herein gathers and utilizes information on the current capacities of one or more dumpsters and garbage trucks in a particular geographic area, the locations of all the garbage trucks and dumpsters, and the current traffic conditions on a particular day and time.

In embodiments, the systems, devices, and/or methods used for the garbage pickup system may include (1) a sensor system attached to one or more dumpsters, (2) and a central computer system that interacts with the sensor system to determine where a garbage truck is to go and at what particular time the garbage truck is meant to go.

In embodiments, the sensor system may include an Internet of Things (IOT) computing device that can be installed on the lid of a dumpster. In embodiments, the sensor system may be battery powered and may use solar panels mounted to the dumpster (such as to the dumpster lid) to allow for the battery to be charged. In embodiments, the sensor system may include a camera, an ultrasonic sensor, a motion sensor, a methane tester, $CO_2$ concentration tester, and/or an odor tester. In embodiments, the sensor system may also contain a microprocessor and an antenna for electronic communications with a communications system (e.g., wireless system).

In embodiments, the sensor system may take measurements from the dumpster lid looking down toward the bottom of the dumpster. In embodiments, a camera (that is part of the sensor system) may take electronic images (such as at particular time intervals—every 10 minutes, every 30 minutes, every 90 minutes, etc., or after a particular amount of time after a dumpster lid is opened or closed). In embodiments, the sensor system may automatically electronically send the electronic images back to central computer system (such as a server). In embodiments, the central computer system may determine the remaining trash capacity of the dumpster based on the one or more electronic images (and/or measurements). In embodiments, the central computer system may have artificial intelligence (AI) systems that assist in determining the remaining trash capacity of the dumpster.

In embodiments, the sensor system may include a motion sensor that can turn on a sleep mode for the sensor system. In embodiments, the sleep mode may be used to conserve the sensor system's battery power. For example, if the dumpster lid has not moved within a particular amount of time (e.g., in one hour), then the sensor system is turned off. Once the motion sensor detects movement, the system exits sleep mode, turns on the sensors and begins to take measurements of garbage quantities inside of the dumpster. In embodiments, the sensor system may send electronic information independently (i.e., at different times) of the camera device sending electronic information. In embodiments, the camera may use the power system of the sensor system or the camera system may have its own power system (e.g., a battery). In embodiments, recharging the batteries may also be accomplished by using induction coils. An induction coil may be placed under the dumpster and another coil mounted securely to the bottom of the dumpster. In embodiments, the coil under the dumpster may be connected to an electrical source. In embodiments, the coil mounted to the bottom of the dumpster may be connected to the batteries. Accordingly, the dumpster may be lifted for emptying but can also be charged using electricity from the electric grid.

In embodiments, the sensor system may take periodic measurements of the amount of methane inside the dumpster at particular intervals of time (e.g., every 30 minutes, every 60 minutes, etc.) and/or at particular day of the week (e.g., every day, once every day, etc.). In embodiments, methane measurements may be used for dumpsters that allow for disposal of biodegradable waste (such as food). Different types of biodegradables may generate different amounts of methane gas. For example, dry biodegradable may generate less methane than other biodegradables such as fish or eggs.

Accordingly, knowing the quantities of methane being released in real time at each biodegradable-containing dumpster allows for the sensor system to determine how much methane is being released to the atmosphere and not being collected for processing. Such information about the amount of methane can be useful for routing garbage trucks. For example, a one-third-full dumpster that is venting a particular quantity of methane above a particular threshold quantity may be prioritized over a two-third full dumpster that has a quantity of methane below a particular threshold quantity. In embodiments, a temperature sensor could be incorporated to measure the temperature inside the dumpster. In embodiments, the sensor system may determine that temperatures above a particular threshold temperature are related to a quantity of methane that is greater than a particular threshold level.

In embodiments, the garbage pickup system also includes a routing system which works with the sensor system to provide for real-time routing of garbage trucks. In embodiments, electronic information from the sensor system may be electronically communicated to a garbage truck and provide electronic instructions on when and where the garbage truck should be sent.

In embodiments, the routing system may receive electronic information and electronically generate a route on an electronic map displayed on a graphical user interface provided in a garbage truck cab area. In embodiments, the routing system may also include a routing computing device. In embodiments, the routing computing device electronically communicates with hydraulic gages on a truck's ram, the position gages on the truck's ram, the weight gages installed on the truck, and/or a truck camera system that could allow the system to calculate the remaining capacity in the truck.

In embodiments, the truck camera may be used to measure the truck's garbage storage capacity. In embodiments, the routing box may transmit the garbage truck's capacity information, location information, and/or any other information to a central computer system. In embodiments, the electronic information for the hydraulic gages and position gages indicates how much garbage is being stored by the garbage truck. In embodiments, sensors may send electronic information about the location of the garbage truck gages which have different positions with differing amounts of garbage. In embodiments, based on the sent electronic information about the garbage truck, the routing computing device may receive real-time routing information on where and when the garbage truck is to be driven.

In embodiments, the garbage pickup system may also include a central computer system that may receive electronic information from the individual dumpsters and the additional electronic information from the individual trucks. In embodiments, the central computer system may run an iterative optimization algorithm to determine a particular route for one of more garbage trucks so as to minimize miles driven, trips to the landfill facilities, near-capacity and overfilled dumpsters, release of potential methane gas, additional labor costs and/or other issues. In embodiments, the algorithm may be changed to take into consideration changing factors associated with picking up of garbage from one or more dumpsters.

For example, the central computer system may determine one or more variables so as to make a probability of an overfilled dumpster to be less than 0.1%. Alternatively, if a higher probability of an overfill is acceptable, the control computer system may set different variables so that miles driven and crew overtime may have a greater weight than overfill probability in the determination of garbage truck routes. In embodiments, the central computer system may store historical data from each individual dumpster and truck and use historical data to determine future pickup times and locations. For example, if a particular dumpster receives 5 cubic yards of cardboard boxes every Tuesday afternoon between 4:00 PM and 5:00 PM, the system will know this and use that information as it optimizes the pickup routes. Thus, if at 3:00 PM, the dumpster is 60% full, a truck will be routed to pick up the dumpster before 4:00 PM. In embodiments, the central computer system may store electronic information with weight information, size information (e.g., garbage measured in cubic feet), or both weight and size information.

Accordingly, the systems, methods, and/or devices described herein provide for a garbage pickup system that provides (a) for an integrated system with a central computer device, trash dumpster-located sensors, truck-based sensors, and a truck routing screen (or link to direct the next destination to the garbage truck), (b) trash dumpster sensor system may include one or more batteries, a microprocessor, solar panels mounted to the top of the dumpster lid, one or more cameras, one or more, ultrasonic sensors, one or more motion sensors, one or more methane testers, and/or one or more odor testers, (c) a through-the-lid sensor attachment to allow retrofit of the trash dumpster sensors onto existing dumpsters, (d) a two part sensor system to minimize damage to a corrugated lid while embedding the batteries and sensors within the corrugations to prevent damage to those components, (e) optimization of garbage truck routing based on historical data, and/or (d) optimization of garbage truck routing based on current and future traffic condition.

FIG. 1 is a diagram of an example user interface (part of a routing system) for a garbage pickup system. As shown in FIG. 1, cab 100 of a garbage truck is shown with a driver. Also, as shown in FIG. 1, user interface 102 is attached to a portion of cab 100. In embodiments, user interface 102 may be a device that includes a graphical user interface that electronically displays a map and a particular route. Based on the electronic information, a driver of the garbage truck may use user interface 102 to determine what particular route should be taken. In embodiment, user interface 102 may include an audio feature that allows for the driver to hear directions and to minimize distractive driving. In embodiments, user interface 102 may be part of a routing device which is a computing device that can generate electronic information on user interface 102. In embodiments, the routing device may send electronic information about the garbage truck's location and also the amount of garbage being held by the garbage truck (e.g., based on sensors attached to garbage truck features such as on gages or weight sensors). In embodiments, the routing device may receive electronic information on the location of a particular dumpster.

Figure 2:
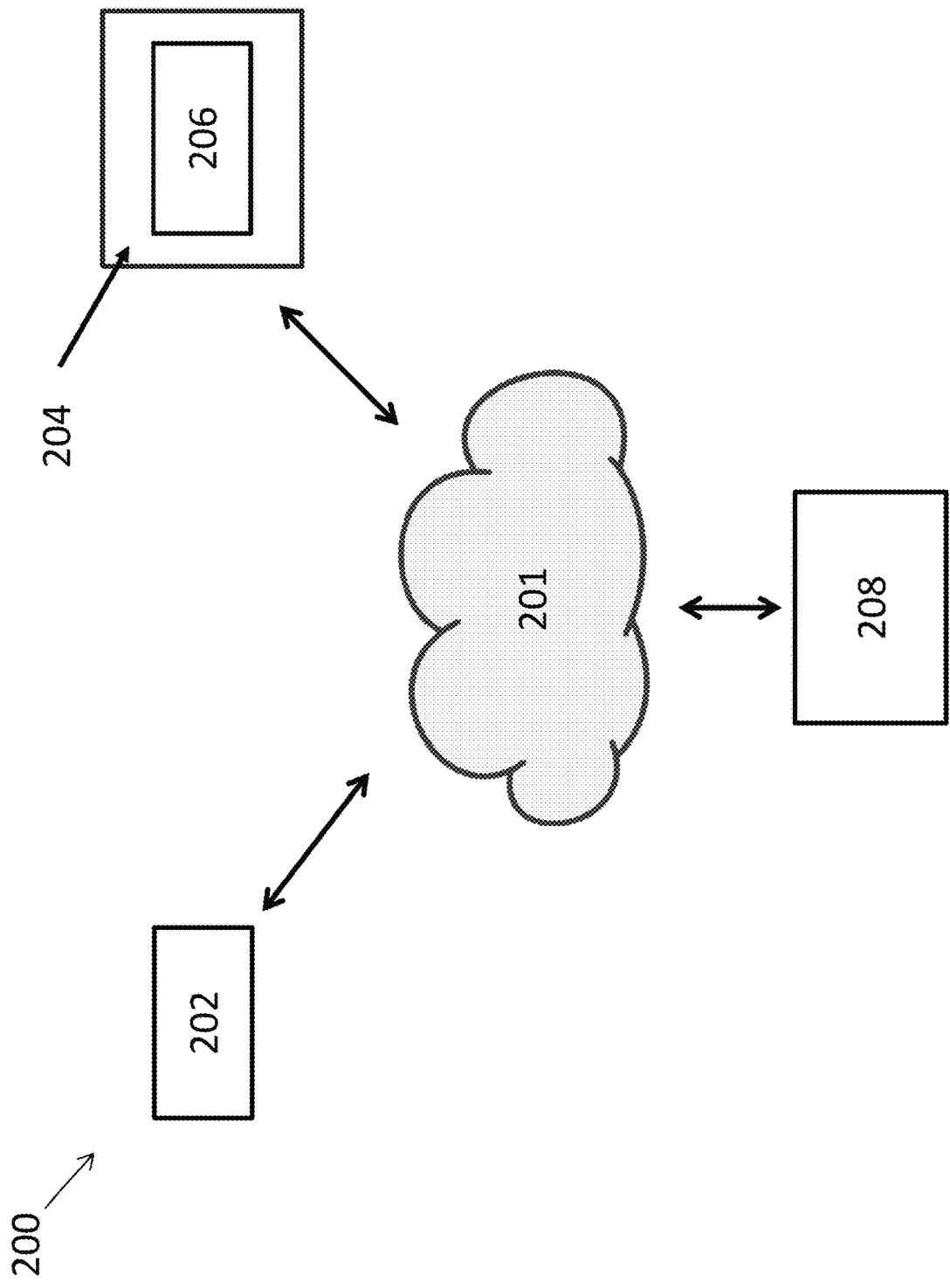
FIG. 2 is a diagram of a network environment.

FIG. 2 is a diagram of example environment 200 in which systems, devices, and/or methods described herein may be implemented. FIG. 2 shows network 201, sensor system 202, routing system 204, routing application 206, and central server 208. Network 201 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. While FIG. 2 shows a single sensor system 202, routing system 204, routing application 206, and central server 208, each of these features may be indicative of one or more such features (e.g., sensor system 202 may indicate multiple sensor systems 202).

Additionally, or alternatively, network 201 may include a cellular network, a public land mobile network (PLMN), a second generation (2G) network, a third generation (3G) network, a fourth generation (4G) network, a fifth generation (5G) network, and/or another network. In embodiments, network 201 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications. In embodiments, network 201 may include a cloud network system that incorporates one or more cloud computing systems.

Sensor system 202 may include any computation or communications device that is capable of communicating with a network (e.g., network 201). Sensor system 202 may include one or more battery systems, a microprocessor, solar panels, a camera device, an ultrasonic sensor, a motion sensor, a methane tester, and/or odor sensing device. In embodiments, the camera device may be physically separate device or may be physically attached to the sensor device portion of sensor system 202. Sensor system 202 may include a wireless antenna, a satellite communication device, and/or any other type of device that permits sensor system 202 to electronically communicate with network 201. In embodiments, sensor system 202 may be attached to a dumpster (such as attached to the dumpster lid).

In embodiments, the battery system may be any system that can be used to power sensor system 202. In embodiments, the battery system may use solar energy generated by solar panels. Alternatively, the battery system may not use any solar panels and may have a built-in power source that can last for a particular period of time and that can be replaceable. Alternatively, the battery system may include double AA, triple AAA, or D style replaceable batteries. Or, the battery system may be lithium battery pack. In embodiments, the solar panels may be any type of system that can receive energy from the sun and then convert the energy for use by the battery system to power sensor system 202. In embodiments, the solar panels may be of any quantity, shape, or material as long as the solar panels provide the amount of energy to operate sensor system 202 via the battery system. In alternate embodiments, recharging the batteries may also be accomplished using induction coils (which can also be used as a backup power supply to the solar panels). An induction coil may be placed under the dumpster and another coil mounted securely to the bottom of the dumpster. In embodiments, the coil under the dumpster could be connected to an electrical source (e.g., the electric grid, a generator, etc.). In embodiments, the coil mounted to the bottom of the dumpster may be connected to the batteries. Accordingly, the dumpster could still be lifted for emptying but could also be charged using electricity from the electric grid.

In embodiments, the camera device, that is part of sensor system 202 may include any device that is capable of generating electronic images and/or video content when the camera device is automatically pointed in a particular direction and activated to take the electronic images and/or video content. In embodiments, the camera device may be pre-programmed to take images at particular times and locations. Alternatively, the camera may receive electronic communications from central server 208. In embodiments, the camera device may be powered by the battery system and generates electronic images that are dependent or independent on the information that is received by sensor system 202. In embodiments, the camera device may include a timing system that operates the camera device to automatically take images at particular time intervals. In embodiments, the camera device may have its own power source (e.g., battery) or may use the power from the battery system operating sensor system 202. In embodiments, the camera device may only turn on when electronic communications are received from a motion sensor that is part of sensor system 202, sensing when a dumpster lid is opened. In embodiment, the camera device may have wireless communication features that permit the camera device to electronically communicate with network 201 and send electronic images via network 201. In embodiments, the camera device may take electronic images based on communications from central server 208, independently of when sensor system 208 obtains electronic information. In embodiments, the camera device may be a separate device from system 202

Sensor system 202 may include an ultrasonic sensor. In embodiments, the ultrasonic sensor senses the distance of objects from the ultrasonic sensor. For sensor system 202, the ultrasonic sensor may detect the distance between the garbage within a dumpster and sensor system 202 (which is attached to the bottom surface of the dumpster lid). Based on the distance between the garbage and the ultrasonic sensor, sensor system 202 may determine the amount of garbage inside the dumpster and, thus, send electronic communications, via network 201, to central server 208. In embodiments, the ultrasonic sensor may be a drip-proof type, high-frequency type, or open structure type ultrasonic sensor. In embodiments, sensor system 202 may have one or more multiple ultrasonic sensors. In embodiments, different types of dumpsters may have different quantities of ultrasonic sensors. For example, a recyclable dumpster may have one particular number of ultrasonic sensors and a general (all types of garbage) dumpster may have another number of ultrasonic sensors that is different than the recyclable dumpster.

Sensor system 202 may include a motion sensor. In embodiments, the motion sensor may be used to detect movement of the garbage lid and may also be used to turn on sensor system 202 in the event of the garbage lid being opened. For example, if the dumpster lid has not moved within a particular amount of time (e.g., in 15 minutes), then the sensor system may enter a sleep mode (e.g., where the sensor system is using less power than the amount of power needed by the sensor system to obtain and send various types of electronic information). Once the motion sensor detects movement of the lid, the battery of sensor system 202 is turned back on to reactivate the sensor system which begins to take measurements of garbage quantities inside of the dumpster.

Sensor system 202 may include a methane sensor. In embodiments, the methane sensor may take periodic measurements of the amount of methane inside the dumpster at particular intervals of time (e.g., every 30 minutes, every 60 minutes, etc.) and/or at particular day of the week (e.g., every day, once every day, etc.). In embodiments, these intervals may vary based on weather conditions and temperatures inside the dumpster. For example, when the outside temperature is above a particular threshold (e.g., above 80 degrees Fahrenheit), the methane detector may take measurements every 30 minutes. In embodiments, when the outside temperature is below a particular threshold (e.g., below 50 degrees Fahrenheit), the interval of taking measurements may be every three hours. In embodiments, sensor system 202 may vary the number of measurements may be based on the previous results. For example, if the methane sensor detected a high concentration of methane at 1:00 PM on a day with an outside temperature of 85 degrees F., sensor system 202 may take another measurement 30 minutes later. In another example, if the methane sensor detected a low concentration, sensor system 202 may take another measurement two hours later. Different types of biodegradables may generate different amounts of methane gas. For example, a dry biodegradable may generate less methane than other biodegradables such as fish or eggs.

Accordingly, knowing the quantities of methane being released in real time at each biodegradable-containing dumpster allows for the sensor system to transmit information to central server 208 may be used in prioritizing the dumpsters and, thus, determine when to send a dumpster truck to pick up the garbage from that particular dumpster. In embodiments, if the amount of methane in a particular dumpster is determined to be greater than a particular threshold, then central server 208 may use this information to generate routing information that sends a garbage truck to this particular dumpster before sending the garbage truck to a different, fuller, dumpster.

Sensor system 202 may include an odor sensing device. In embodiments, the odor sensing device may detect the presence of particular odors that should be minimized. In embodiments, the presence and strength of certain odors (like sulfur) may be used to prioritize pick up of a partially full dumpster ahead of when it would have been normally picked up. In embodiments, the early pick up may occur before a fuller dumpster if the particular odors are occurring at a dumpster at a particular geographic location, such as at or near a residential community, school, church, etc. In embodiments, the odor sensing device may detect those odors which can be used to determine routing for one or more garbage trucks.

Routing system 204 may be any computation or communications device that provides electronic routing information and electronic communications for a garbage truck to travel to a particular location at a particular time. Routing system 204 may be a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device. In embodiments, routing system 204 may be attached to a garbage truck.

Routing system 204 may receive electronic information from central server 208 and electronically generate a route on routing application 206. Routing system 204 may electronically communicate with hydraulic gages on a truck's ram, the position gages on the truck's ram, the weight gages installed on the truck, and/or a truck camera system, and any other sensors on the truck designed to measure the current capacity of the truck. In embodiments, sensors (e.g., ultrasonic sensors) may be attached to a hydraulic and position gages and send electronic information to routing system 204. In embodiments, a truck camera may be used to measure the truck's garbage storage capacity. In embodiments, routing system 204 may transmit the garbage truck's capacity information, location information, and/or any other information to central server 208. In embodiments, based on the sent electronic information about the garbage truck, routing system 204 may receive real-time routing information on where and when the garbage truck is to be driven. Routing system 204 may conduct one or more of the processes conducted by central server 208. Central server 208 may one or more of the processes conducted by routing system 204.

Routing application 206 may receive and/or display electronic content from routing system 204 and/or central server 208. In embodiments, the electronic content may include objects, data, images, audio, video, text, files, and/or links to files accessible via one or more networks. Content may include a media stream, which may refer to a stream of electronic content that includes video content (e.g., a video stream), audio content (e.g., an audio stream), and/or textual content (e.g., a textual stream). Routing application 206 may use an electronic graphical user interface to display content and/or information. Routing application 206 may operate via a touch screen and/or a keyboard (that is part of routing system 204) that allows a user to electronically interact with routing application 206. In embodiments, a user of routing application 206 may swipe, press, or touch a user device portion of routing system 204 in such a manner that one or more electronic actions will be initiated via routing application 206.

For example, a user may use routing application 206 to change electronic map features, such as zoom in/zoom out features, and changing how alerts or electronic information is provided (e.g., via audible or visual). Routing application 206 may display electronic information regarding past garbage pickup information over a particular period of time. Routing application 206 may display electronic information regarding garbage dumpster locations. Routing application 206 may provide options on pickups instead of providing specific instructions to pick up at a particular location. Routing application 206 may provide audible instructions to a user (e.g., instructions on the location of a dumpster, instructions on a garbage truck driver to take a break, take the garbage truck back to the maintenance yard (or processing station) based on a determination of an issue with the garbage truck's ram, etc.). In embodiments, routing application 206 may receive electronic information via a user device (e.g., user device 205) keyboard or via audio commands (e.g., driver requests break to use the restroom, a problem exists with the truck, diver reports a maintenance problem with the truck's ram that takes the truck out of service, etc.) that are converted into electronic information by routing application 206. Thus, such received electronic information may be used to determine which truck can/should go to a particular dumpster location.

In embodiments, routing application 206 may include one or more of the processes conducted by central server 208 (as described further). For example, routing application 206 may include receiving electronic information from sensor 202, and, based on the electronic information received from sensor system 202, generate electronic routing information and electronic communications for a garbage truck to travel to a particular location at a particular time. In addition, sensor system 202 may perform one or more processes performed by central server 208. Furthermore, sensor system 202 may include one or more databases (e.g., as described in FIGS. 12 and 13). In addition, routing application 206 may include one or more of the processes conducted by routing system 204, such as electronic information from sensors mounted on a garbage truck and send capacity information to central server 208. In embodiments, routing application 206 may receive electronic commands via routing system 204 (e.g. via a keyboard on routing system 204) or a microphone that receives sounds that are converted to electronic information for use by routing application 206 to determine a particular route for a particular garbage truck.

Central server 208 may be any computation or communications device that can receive electronic information from sensor system 202 and, based on the electronic information received from sensor system 202, generate electronic routing information and electronic communications for a garbage truck to travel to a particular location at a particular time. Central server 208 may be a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, or another type of computation or communications device.

Central server 208 may include one or more databases that can store electronic information about dumpster locations, garbage truck locations. Central server 208 may include one or more databases that store electronic information about previous garbage pickup times and locations, and quantities of garbage being picked up during those particular times and locations. Central server 208 may include one or more databases that can store electronic information about historical (e.g., past) dumpster fill times and quantities. While FIG. 2 shows a single central server 208, central server 208 may include multiple computing devices. Also, while central server 208 may be shown as a separate device from sensor system 202, central server 208 may be a part of sensor system 202 and/or routing system 202. While FIG. 2 shows a single sensor system 202, multiple sensor systems 202 may be used. And, while FIG. 2 shows a single routing system 204, multiple routing systems 204 may be used (along with multiple routing applications 206) in the described networking environment.

Figure 3:
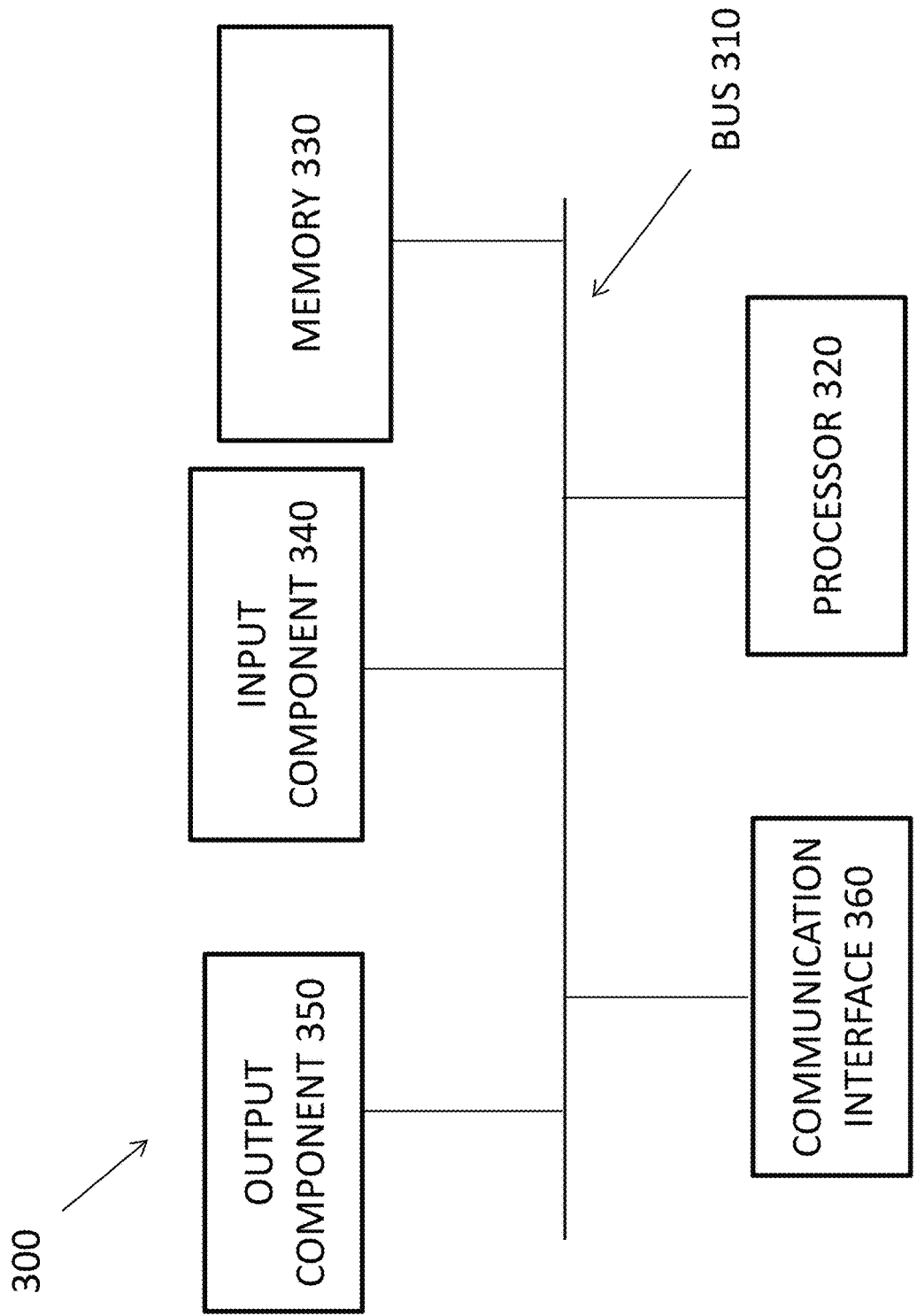
FIG. 3 is a diagram of an example computing device.

FIG. 3 is a diagram of example components of a device 300. Device 300 may correspond to network 201, sensor system 202, routing system 204 and/or central server 208. Device 300 may be part of one or more the devices that are part of network 201, sensors system 202 (e.g., camera device, battery system, etc.), routing system 204, and/or central server 208. Alternatively, or additionally, network 201, sensor system 202, routing system 204 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like. In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 201.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
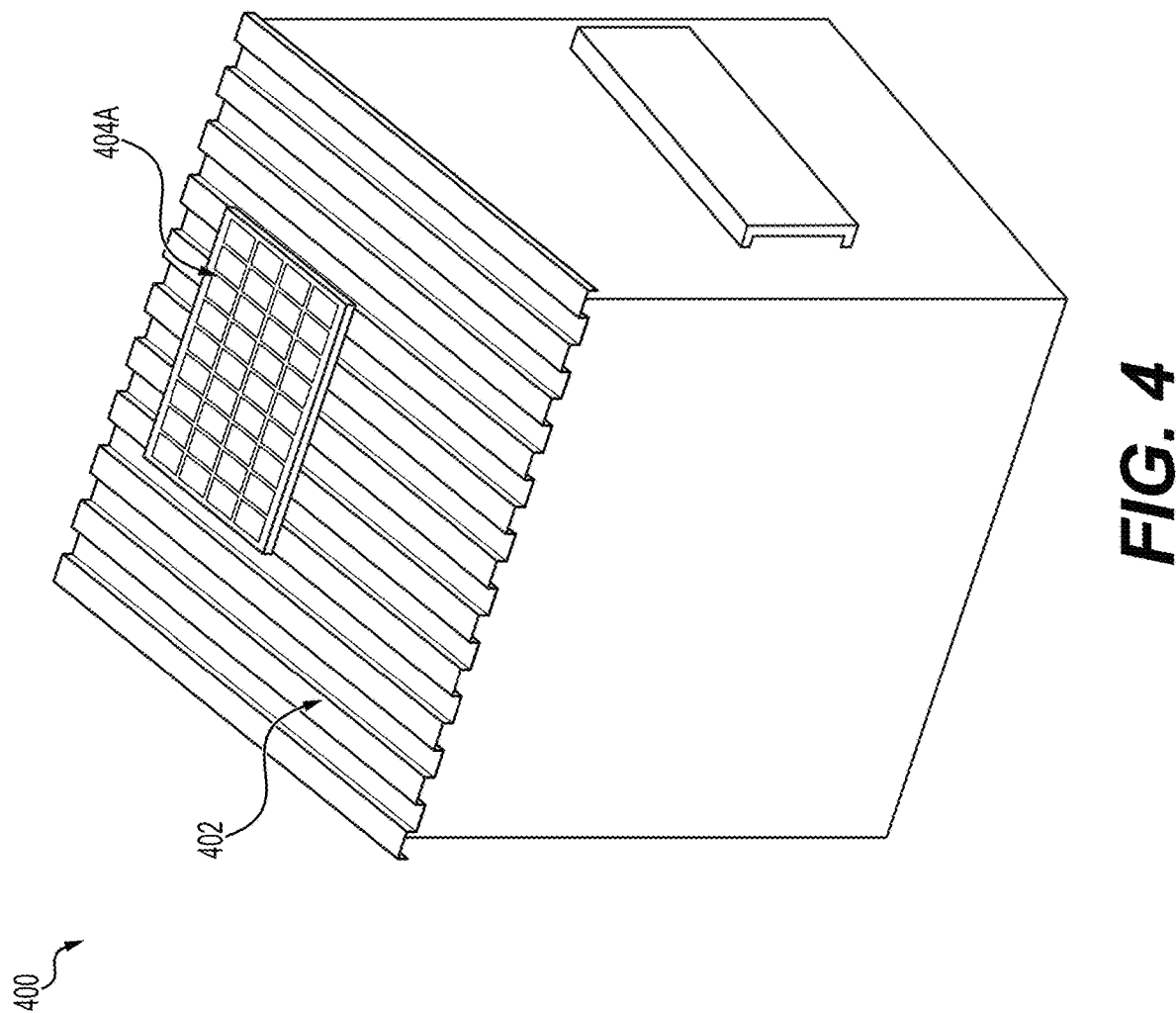
FIG. 4 is a diagram of an example garbage dumpster.
Figure 5:
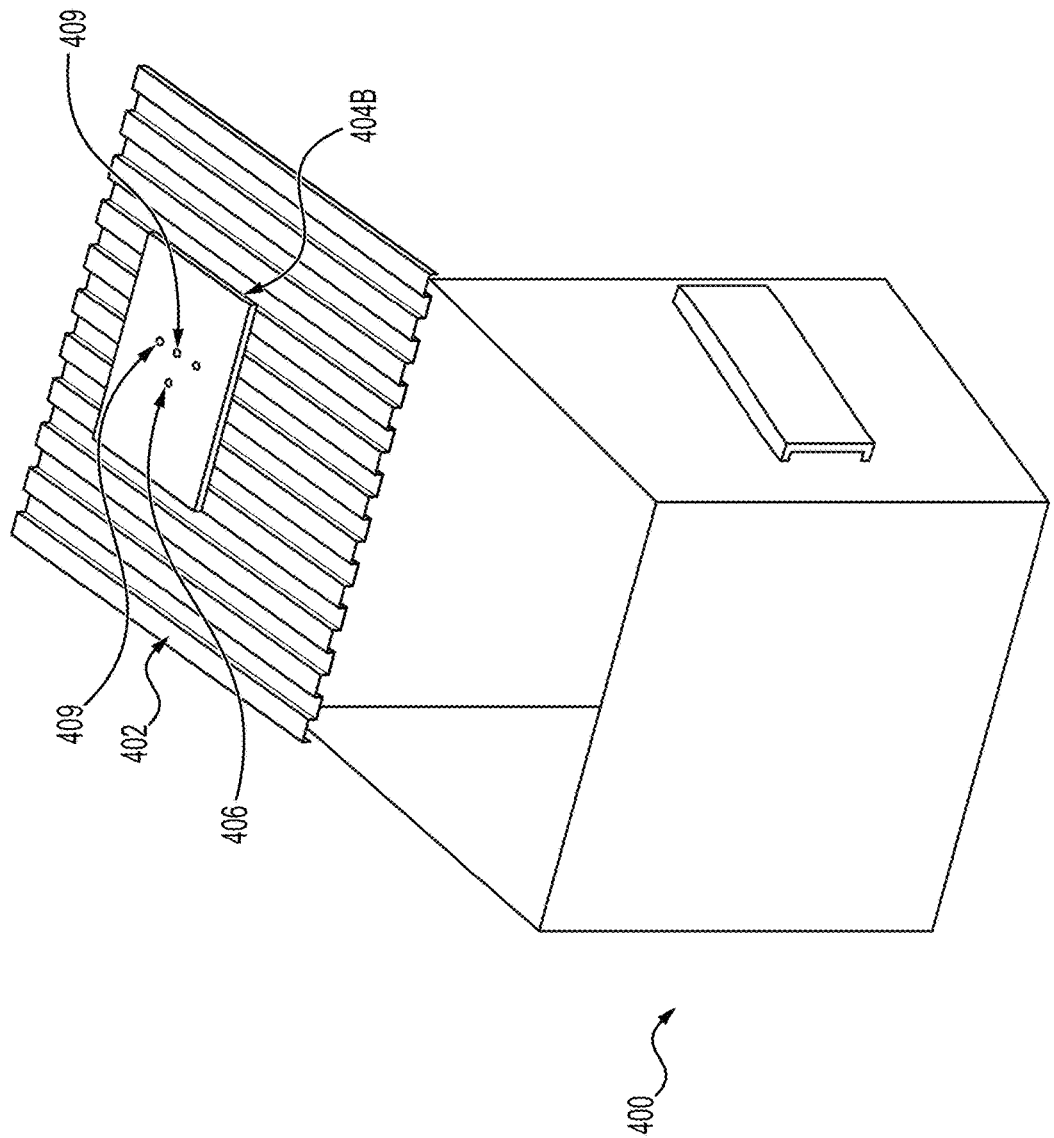
FIG. 5 is a diagram of an example garbage dumpster.

FIG. 4 is an example diagram of a dumpster installed with a sensor system (such as sensor system 202). As shown in FIG. 4, dumpster 400 is shown with top portion 404A of the sensor system attached to top surface of dumpster lid 402. Both FIGS. 4 and 5 show a schematic design of the corrugated design feature of dumpster lid 402. As shown in FIG. 4, top portion 404A of sensor system 402 are solar panels and a battery system (not visible) that is located below the solar panels and attached to dumpster lid 402. FIG. 4 shows dumpster lid 402 in the closed position. FIG. 5 is an example diagram of dumpster 400 with the bottom portion 404B of the sensor system attached to the bottom surface of lid 402. FIG. 5 also shows camera 406, which may be part of sensor system 402, and is also attached to dumpster lid 402. FIG. 5 also shows three other sensors (409) which could be ultrasonic sensors, methane gas sensors, odor sensors, cameras, or any other combination of sensors. In embodiments, camera 406 may take images that can be electronically sent to a remote device (e.g., central server 208). FIG. 5 shows dumpster lid 402 in the open position.

Figure 6:
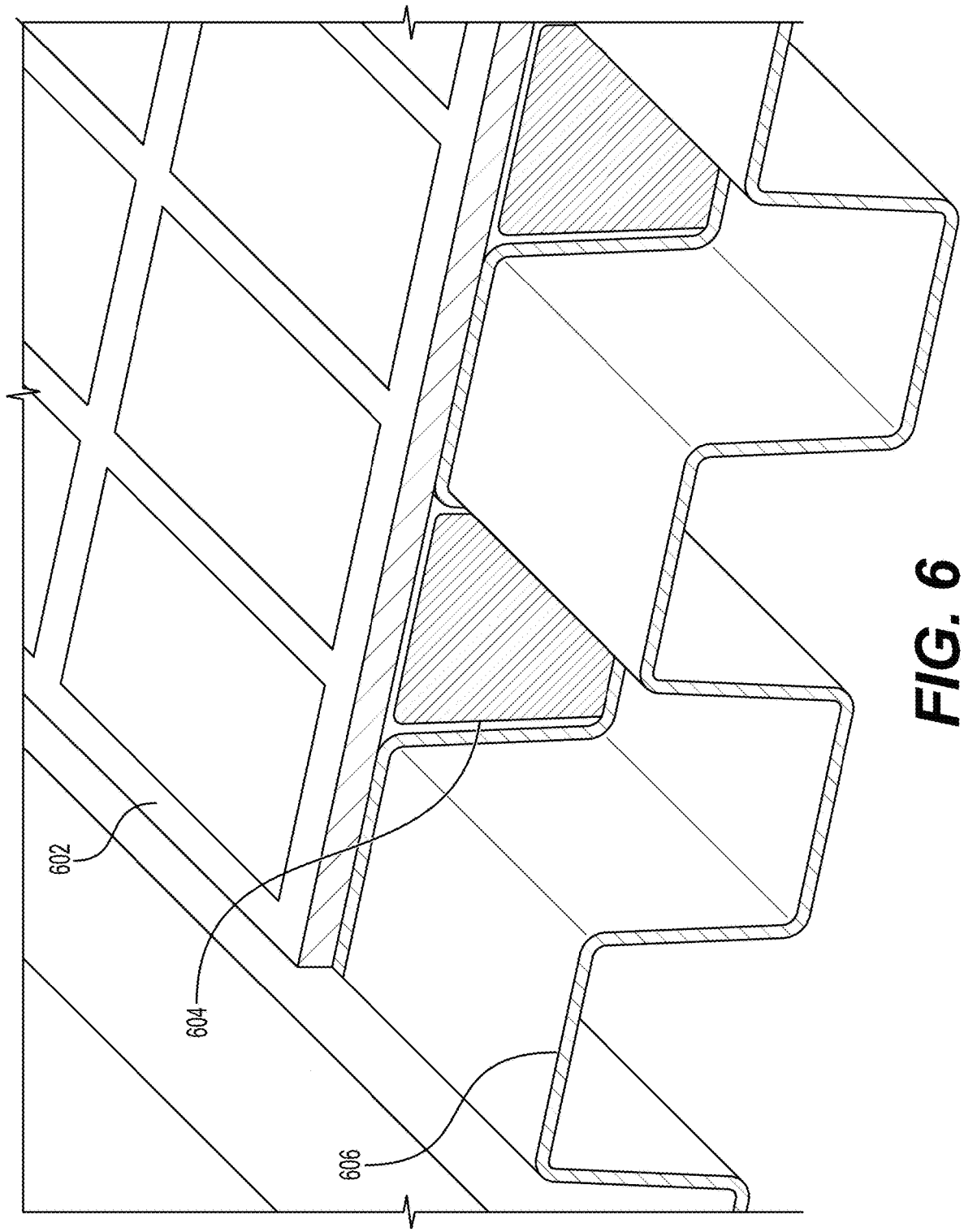
FIG. 6 is a diagram of an example battery system.

FIG. 6 is an example diagram of solar and battery system installed on the top of dumpster lid 606. In embodiments, dumpster lid 606 may be similar to dumpster lid 404 described in FIGS. 4 and 5. In embodiments, dumpster lid 606 may be constructed of plastic, wood, metal, or a composite material. In embodiments, dumpster lid 606 may be of a material that permits wiring or other features that connect the solar and battery system shown in FIG. 6 with a sensor system described in other figures. In embodiments, the solar and battery system shown in FIG. 6 includes solar panels 602 and battery system 604. As shown in FIG. 6, dumpster lid 606 has a corrugated (i.e., block and groove design) with grooves 606A which permit fitting battery system 604 into grooves 606A. Thus, battery system 604 may be designed to fit into dumpster lid 606 grooves without a need to use any other attaching device for holding battery system 604 in place within dumpster lid 606. Alternatively, screws, nails, pins, and/or another type of attachment device can be used to connect solar panels 602 to dumpster lid 606. While FIG. 6 shows dumpster lid 606 with a corrugated design, dumpster lid 606 may be a flat surface with battery system 604 (then also having a flat surface) attached to the top surface of dumpster lid 606.

As shown in FIG. 6, solar panels 602 and battery system 604 may be part of a sensor system, such as sensor system 202. In embodiments, battery system 604 may provide direct current (DC) power. In alternate embodiments, battery system 604 may include an inverter to convert received solar power (which may be DC power) into AC power in the event that a dumpster has additional systems, processes, and/or devices that require AC power.

In embodiments, battery system 604 receives the solar energy which is then converted to AC power via an inverter (that is part of battery system 604). While not visible in FIG. 6, an electronic connector (shown in FIGS. 7 and 9 as connector 705) connects battery system 604 to a sensor portion of the sensor system. In embodiments, solar panel 602 may be made up of solar cells with each solar cell constructed of layers of silicon, boron and phosphorus. In embodiments, solar panels 602 may be monocrystalline panels, polycrystalline panels, passive emitter and rear cell (PERC) panels, or thin-film solar panels. In embodiments, battery system 602 may be a lead-acid, lithium ion, nickel cadmium, or a flow battery system. In alternate embodiments, battery system 604 may have a different shape (e.g., cylinder, cubic, etc.) but can still fit into the groove areas of the dumpster lid.

Figure 7:
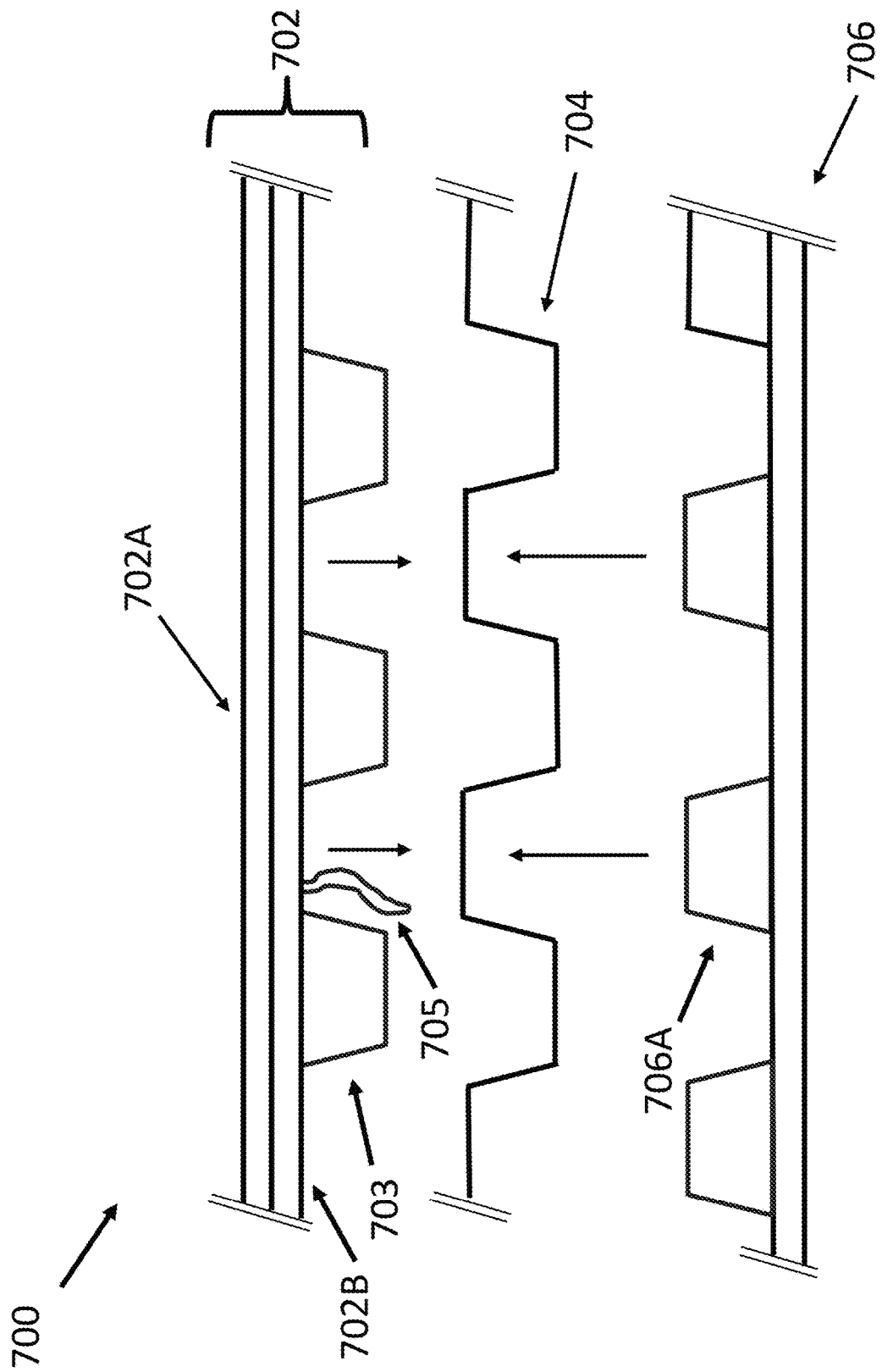
FIG. 7 is a diagram of an example solar and sensor system.

FIG. 7 is an example schematic diagram 700 showing a side perspective of a portion of a sensor system and its location relative to a corrugated dumpster lid. As show in FIG. 7, solar system 702A is attached to battery system 702B which together are describing power system 702 which may be a part of sensor system 202. In embodiments, power system 702, which is a combination of solar system 702A and battery system 702B, is attached to the top surface of dumpster lid 704. As shown in FIG. 7, battery system includes blocks 703 which are further described in FIG. 9. In embodiments, blocks 703 may extend into the corrugated design features of the dumpster lid. Also, as shown in FIG. 7, sensor device 706 attaches to the bottom surface of dumpster lid 704. In embodiments, solar system 702A, battery system 702B, and sensor device 706 may be a part of a sensor system such as sensor system 202. In embodiments, sensor device 706 includes blocks 706A which fit into the groove areas at the bottom of dumpster lid 704. Thus, sensor device 706 may include an ultrasonic sensor, a motion sensor, a methane gas sensor, and/or an odor sensor. Furthermore, sensor device 706 may include camera 708 which may take electronic images of the interior of a dumpster (for which dumpster lid 704 is attached to the top of the dumpster). Although the camera may be attached separately, it can also be a part of sensor device 706. In embodiments, sensor device 706 is sensing garbage that is located below sensor device 706. Also, as shown in FIG. 7 (and also in FIG. 9), connector 705 may be a wire or other device that can send electronic power from power system 702 to sensor device 706. In embodiments, connector 705 pass through an aperture (e.g., hole) in dumpster lid 704 so as to make a connection between power system 702 and sensor device 706.

Figure 8:
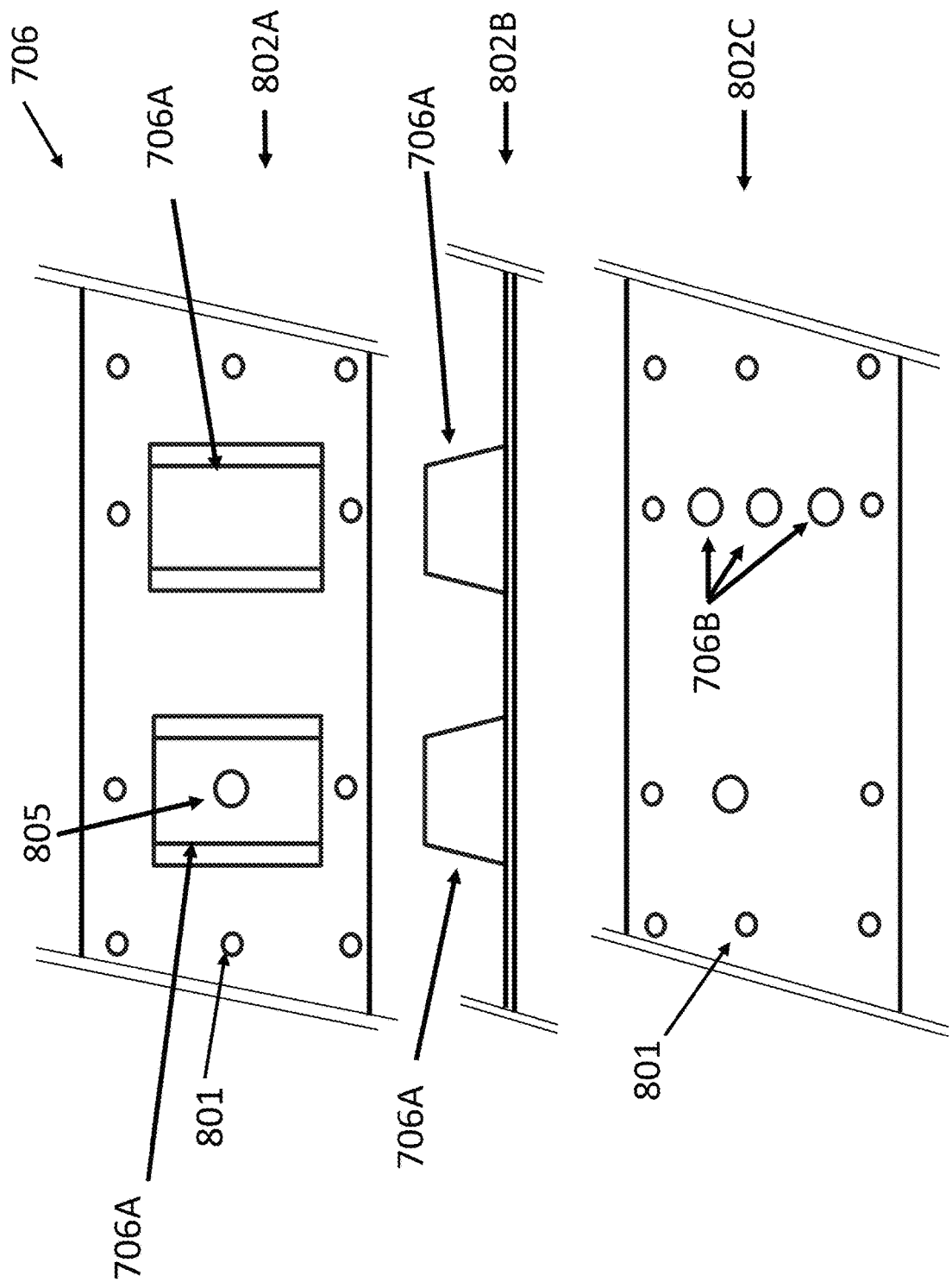
FIG. 8 is a diagram of an example sensor system.

FIG. 8 is an example schematic diagram further describing a portion of sensor device 706. In embodiments, sensor device 706 may be a sensor portion of a sensor system, such as sensor system 202. As shown in FIG. 8, the top portion of sensor device 706 is shown as top view 802A. As shown, top view 802A of sensor device 706 also shows blocks 706A. In embodiments, blocks 706A may fit into groove at the bottom of a dumpster lid such as shown dumpster lid 704. Sensor device 706 is also shown from a side perspective in side view 802B. Also, shown at top view 802A, hole 805 is provided so that wires from connector 705 may connect sensor device 706 to power system 702 so as to receive power. In embodiments, hole 805 may include a rubber gasket or a similar feature. In alternate embodiments, hole 805 may be located outside of block 706A.

FIG. 8 also shows bottom view 802C which shows the bottom perspective view of sensor device 706 if one were to view sensor device 706 from the bottom surface of a dumpster. In embodiments, bottom view 802C shows apertures 801 (which are also shown in top view 802A). In embodiments, attaching devices may be placed in apertures 801 to connect/attach sensor device 706 to the bottom surface of a dumpster lid. In embodiments, apertures 906 (shown in FIG. 9) be located directly above apertures 801 so that one attaching device can pass through each aperture 801 and 906. In embodiments, the attaching device may be screws, nails, pins, or any other device that can attach sensor device 706 onto the garbage lid. In embodiments, bottom view 802C also shows sensors 706B. While three sensor 706Bs are shown, greater or fewer sensors may be shown. In embodiments, each sensor 706B may be all ultrasonic sensors or may be a mix of different types of sensors (e.g., ultrasonic sensors, motions sensors, cameras, methane sensors, etc.).

Figure 9:
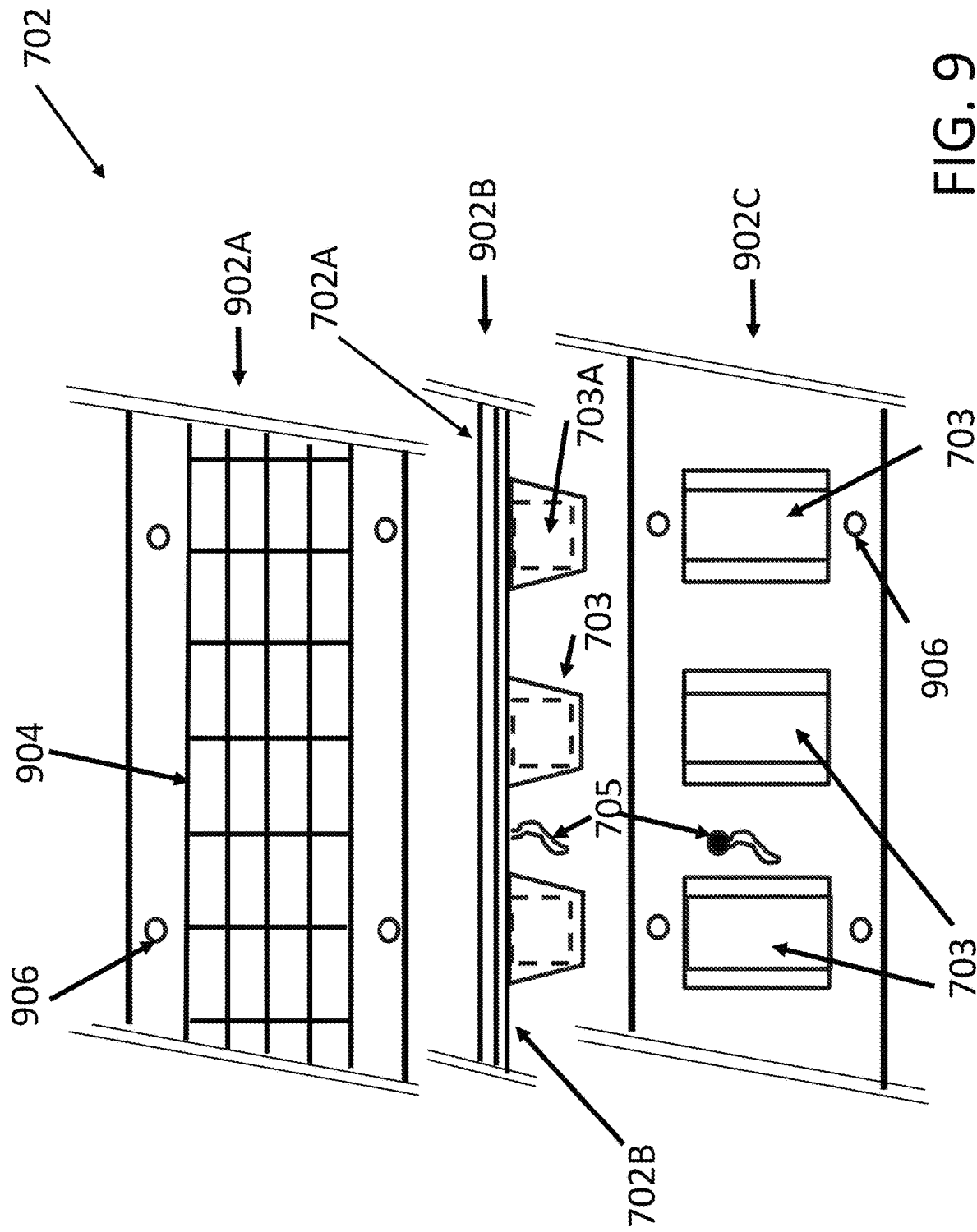
FIG. 9 is a diagram of an example battery system.

FIG. 9 is an example schematic diagram describing a portion of power system 702. As shown in FIG. 9, a top perspective 902A of power system 702 is shown, a side perspective 902B of power system 702 is shown, and a bottom perspective 902C of power system 702 is shown. As shown in FIG. 9, top perspective 902A shows solar panels 904 (similar to solar panels 602) that are attached to the top surface of power system 702. In addition, top perspective 902A shows apertures 906 which may be used to install power system 702 to the top surface of a dumpster lid by using connectors (e.g., screws, nails, bolts, fasteners, etc.).

In embodiments, solar panels 904 may be attached to the top surface of power system 702 by a substrate (e.g., glue-type) or by connectors that fit onto battery portion (battery system 702B).

FIG. 9 also shows side perspective 902B of power system 702. As shown in side perspective 902B, the two sections of power system 702 are visible—solar system 702A and battery system 702B. As shown in battery system 702B, blocks 703 are shown. In embodiments, blocks 703 may fit into groove areas of the top area of a dumpster lid (e.g., dumpster lid 606). Furthermore, as shown in FIG. 9, each block 703 may include battery 703A. In embodiments, each battery 703A may be a lead-acid, lithium ion, nickel cadmium, or flow battery systems. In embodiments, battery 703A may receive solar power from solar panels 902 and then convert the power to AC (alternating current) power for use by a sensor system (e.g., sensor device 706). In embodiments, battery 703A may provide direct current (DC) power. In alternate embodiments, battery 703A may include an inverter to convert received solar power (which may be DC (direct current) power) into AC power in the event that sensor system 702 is part of a dumpster that may have systems, processes, and/or devices that require AC power. embodiments, connector 705 connects to sensor device 706 (through an aperture in the dumpster lid) and provide power to sensor device 706.

Bottom perspective 902C is also shown in FIG. 9. As shown in FIG. 9, blocks 703 are shown from the bottom perspective (as if one as looking directly at the bottom surface of battery system 702). Also, apertures 906 and connector 705 are also shown.

Figure 10:
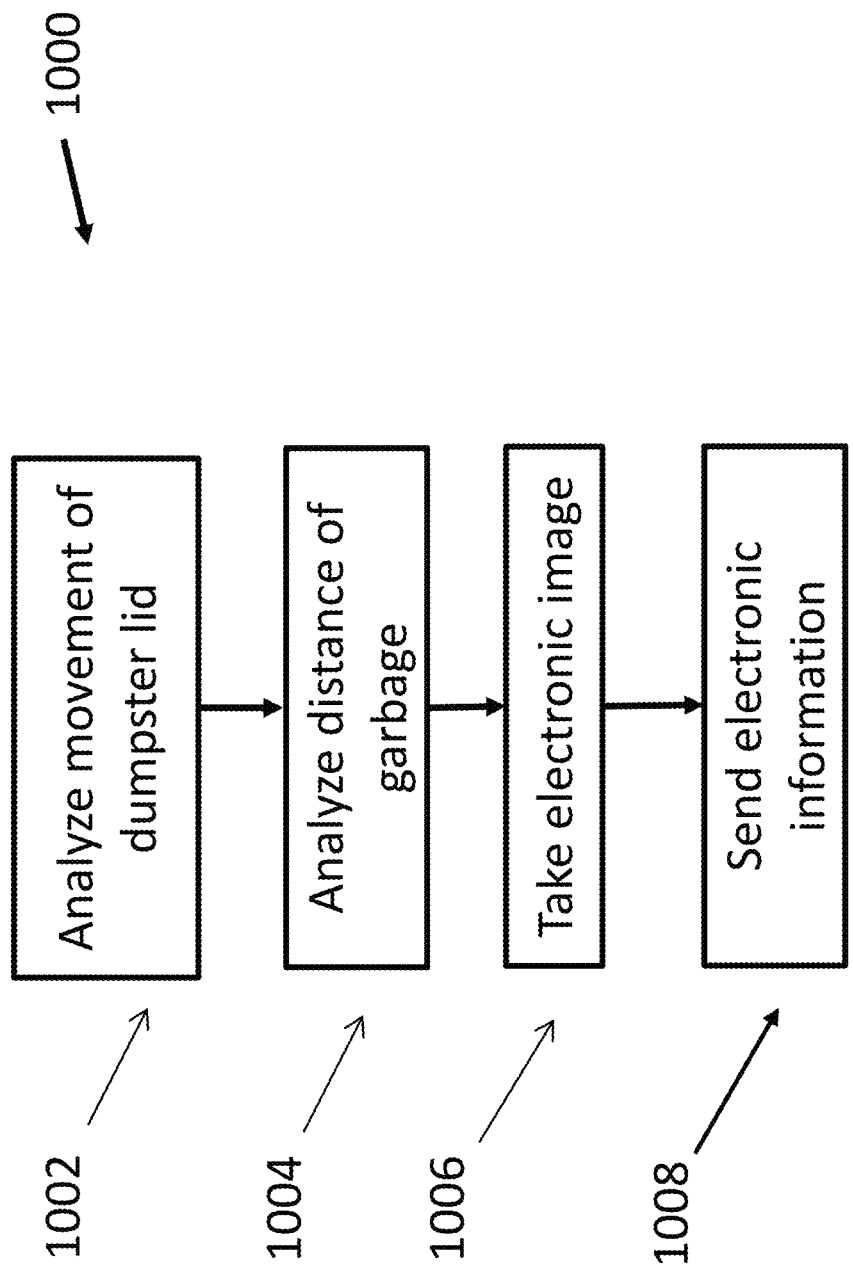
FIGS. 10 and 11 are diagrams of example flow diagrams.

FIG. 10 is an example flow diagram of process 1000 for determining a quantity of garbage in a dumpster. In embodiments, example process 1000 may be performed by sensor system 202. For FIG. 10, the order of the blocks may be modified in other implementations. Further, non-dependent blocks may be performed in parallel.

At step 1002, sensor system 202 analyzes movement of a dumpster lid that is attached to the top (or any other side of a dumpster). In embodiments, sensor system 202 may include a motion sensor (e.g., a tilt sensor) which senses movement of the dumpster lid. In embodiments, the motion sensor may be mounted inside the sensor block (mounted to the lid) so that when the dumpster lid is raised, a ball inside the motion sensor rolls and may touch different contacts. In embodiments, the movement of the ball results in the motion sensor being powered/turned on. In embodiments, sensor system 202 may control a battery system (e.g., battery system 604) that provides power to sensor system 202 such that the battery system conserves power and reduces power to sensor system 202. In embodiments, the motion sensor may be used by sensor system 202 to generate open and close information of the dumpster lid. Thus, sensor system 202 may only require full power for one or more particular time intervals during the day (e.g., for 3 minutes 15 minutes after a dumpster lid is opened, for 4 minutes at 1 PM, etc.). At step 1004, sensor system 202 analyzes the distance between the location of sensor system 202 (located on a dumpster lid such as dumpster lid 402) and the garbage inside a dumpster (e.g., such as dumpster 400). In embodiments, sensor system 202 may include an ultrasonic sensor that determines the distance measurement.

At step 1006, sensor system 202 may take an electronic image of the interior of the dumpster. In embodiments, the electronic imagery may be taken after a particular time from when the dumpster lid is opened (e.g., electronic images are taken five minutes after the dumpster lid is opened.) In embodiments, sensor system 202 may include a camera device that can take electronic images and/or videos. In embodiments, an electronic image may be taken during particular time intervals or may be taken only a time after a dumpster lid is opened. For example, an electronic image may be taken every 45 minutes; or, an electronic image may be taken five minutes after a dumpster lid is opened; or, an electronic image may be taken on a schedule determined by a dumpster's past fill history (e.g., during a particular time of day, days of the week, particular weeks, etc.). In embodiments, the determined schedule may be done by central server 208 which may electronically transmit one or more communications to sensor system 202 to take images during that determined schedule. In embodiments, the camera may have a rotation feature that permits the camera to take images of different locations inside the dumpster. In embodiments the camera system may consist of multiple cameras that are mounted onto different locations inside the dumpster and using different focal lengths so that adequate images in focus are obtained for analysis. In embodiments the camera system may consist of multiple cameras that are mounted in close proximity to each other but may be pointed in different directions and using different focal lengths so as to get clearer pictures of different portions of the inside of the dumpster. In embodiments, the cameras may be self-cleaning cameras in the event that the cameras' lenses become dirty.

At step 1008, sensor system 202 sends electronic information to a central server (e.g., central server 208). In embodiments, the electronic information may include (a) electronic images from inside the dumpster, (b) electronic information about the distance of garbage between the garbage lid and the top surface of garbage (e.g., bags, and non-bagged garbage), and (c) identifier of dumpster bin (d) geographic information, and (e) open and close information (e.g., movement information about when a dumpster lid is opened and closed received from a sensor (e.g. a tilt sensor and/or a motion sensor). In embodiments, a sensor system (e.g., sensor system 202) may include a motion sensor to detect trash being placed into a dumpster, and also a tilt sensor to detect different positions of the dumpster lid. Alternatively, the sensor system may include a motion sensor that detects both garbage being placed in the dumpster and movement of the dumpster lid. In embodiments, sensor system 202 may also send methane gas concentration information in those instances that the dumpster includes biodegradable garbage and where sensor system 202 include a methane gas sensor. In embodiments, sensor system 202 may send the electronic information at particular times during the day. For example, sensor system 202 may send the electronic information every hour, every day at 5 am, every other day at a particular time, etc. In embodiments, sensor system 202 may send electronic images and the sensor information at different times.

Figure 11:
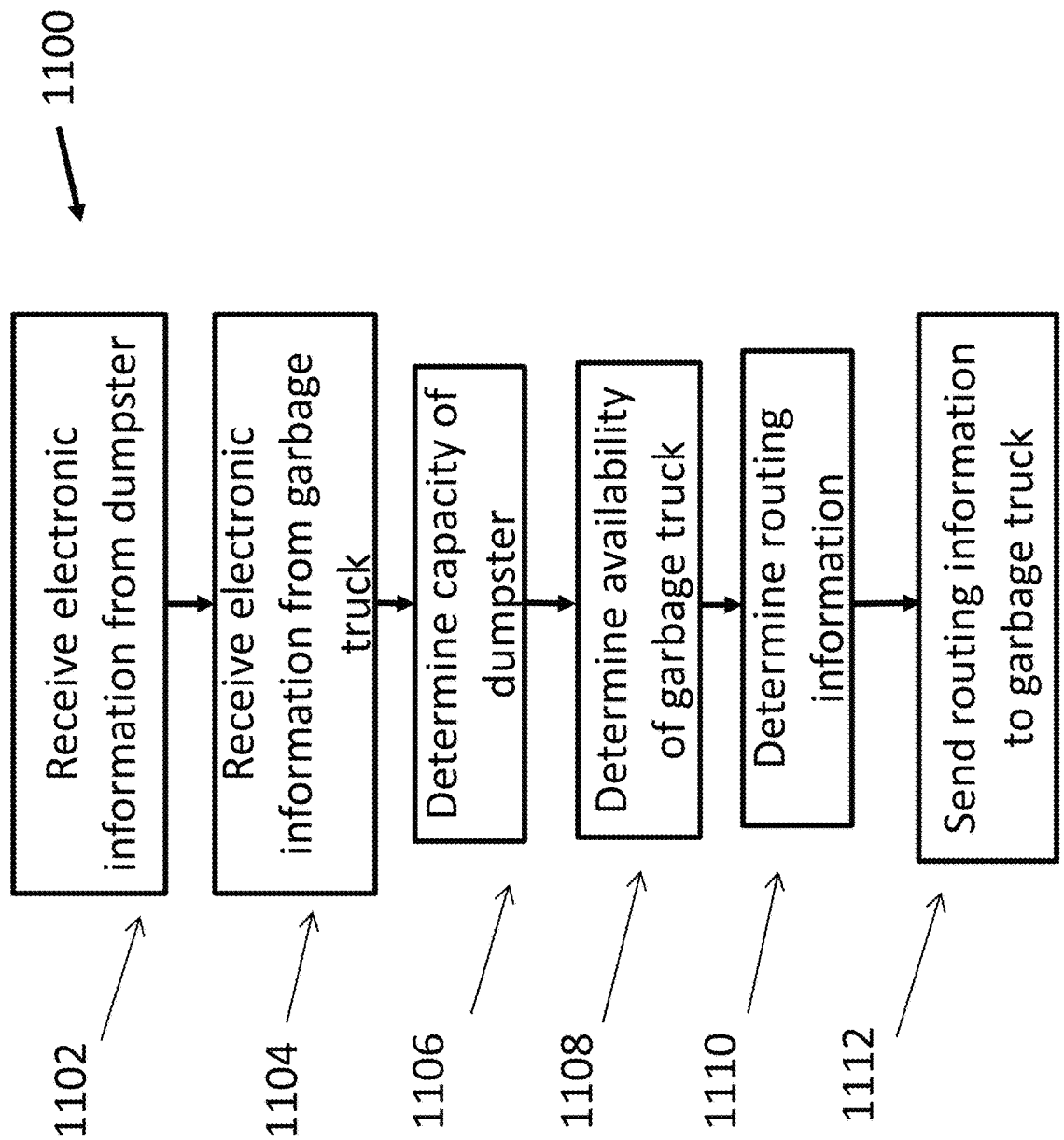

FIG. 11 is an example flow diagram of process 1100 for determining the routing instructions for a garbage truck by determining a quantity of garbage in each dumpster, the capacity available, and the best routing of available trucks within given constraints. In embodiments, example process 1100 may be performed by central server 208. Alternatively, example process 1100 may be performed by sensor system 202 when sensor system 202 has one or more features of central server 208 (such as determining routing information). For FIG. 11, the order of the blocks may be modified in other implementations. Further, non-dependent blocks may be performed in parallel.

At step 1102, central server 208 receives electronic information from a dumpster. In embodiments, the electronic information may include (a) electronic images from inside the dumpster, (b) electronic information about the distance of garbage between the garbage lid and the top surface of garbage (e.g., bags, and non-bagged garbage), and (c) identifier of dumpster bin and (d) geographic information. In embodiments, central server 208 may also receive methane gas quantity information in those instances that the dumpster includes biodegradable garbage and where sensor system 202 include a methane gas sensor.

At step 1104, central server 208 may receive electronic information from one or more garbage trucks. In embodiments, the electronic information received from the garbage truck may include information about (a) garbage truck location, (b) garbage truck identifier, (c) garbage truck maximum capacity, (d) and garbage truck available capacity, (e) the number of available working hours left in the garbage truck crew's work shift, and/or (f) any other information (such as a driver-requested break or fuel remaining in the truck (remaining truck range.)) In embodiments, a routing system (e.g., routing system 204) may be attached to the garbage truck and may obtain the electronic information to send to central server 208. In embodiments, the routing system may include its own camera system that is used to determine the amount of available capacity of the garbage truck to pick up additional garbage. In embodiments, the routing system may have sensors attached to garbage truck gages and also weight sensors that are used to determine the available capacity of the garbage truck.

At step 1106, central server 208 may determine the capacity of one or more dumpsters. In embodiments, central server 208 may determine, based on the electronic information received from a dumpster (as described in step 1102), the capacity of the dumpster. In embodiments, the dumpster capacity determination may be based on imagery that is sent within the electronic information, the distance of the garbage from the lid of the dumpster, and/or other information. In step 1106, central server 208 may also determine the methane gas concentration of a dumpster from electronic information transmitted from the dumpster's methane detector. In embodiments, methane gas concentration may be used by central server 208 to prioritize dumpsters for garbage pickup.

At step 1108, central server 208 may also determine, based on the electronic information received from the garbage trucks (as described in step 1104), the availability of each garbage truck. In embodiments, the garbage truck availability is based on the capacity of the garbage truck, the availability of the crew of the garbage truck, and truck-specific information such as remaining truck range based on fuel or battery remaining. For example, if the garbage truck does not have the capacity to collect additional garbage but the crew is still working, then central server 208 may determine that the garbage truck is not available. Alternatively, if the garbage truck has the capacity to collect additional garbage, but there are not enough working hours for the crew to take the garbage truck to the dumpster location, then central server 208 may determine that the garbage truck is not available.

At step 1110, central server 208 may determine routing information for a garbage truck. In embodiments, central server 208 may determine the routing information based on the electronic information received from one or more dumpsters and also electronic information received from one or more garbage trucks. In addition, central server 208 may determine the routing information based on the availability of the garbage truck crew, traffic conditions in that particular area (e.g., the amount of time it would take for the garbage truck to travel to a particular geographic location), weather conditions (such as rain or snow that may affect travel times for the garbage truck), and/or historical information about the one or more dumpster. In embodiments, historical information may include electronic information about when maximum capacities of a dumpster may occur within a particular time of the day or a particular day. In embodiments, central server 208 may also optimize the routing instructions for each garbage truck within the constraints provided by management such as acceptable overtime and acceptable service levels.

In embodiments, the routing information may be determined by analyzing the load of a particular dumpster and the proximity of a garbage truck to that particular dumpster. Furthermore, the routing information may be determined by determining historical routes that one or more dump trucks typically take. For example, garbage truck ABC has sent electronic information that it is 50% full and has an available capacity of 5 tons. In addition, the sent electronic information includes the location of garbage truck ABC. Also, garbage truck XYZ has also sent electronic information that it is 40% full and has an available capacity of 6 tons. In addition, this sent electronic information includes the location of garbage truck XYZ.

In this non-limiting example, electronic information from dumpster UVI is sent. The electronic information from dumpster UVI may include one or more images of the inside of dumpster UVI. Furthermore, the electronic information from dumpster UVI may include electronic information of the distance of garbage between the top of the garbage inside dumpster UVI and the bottom surface of dumpster UVI's lid. In this example, the dumpster UVI sends electronic information that the distance information is 1.2 feet between the top of the garbage surface and the bottom surface of dumpster UVI's lid. Since the garbage inside the dumpster is not going to have a flat/even surface, sensor system 202 may take have more than one ultrasonic sensor that take multiple readings that may be then averaged together by central server 208. For example, one ultrasonic sensor may determine distance information at the center of the dumpster, another ultrasonic sensor may determine distance information at one end of the dumpster, and a third ultrasonic sensor may determine distance information at the other end of the dumpster.

Alternatively, central server 208 may use the electronic images inside dumpster UVI in combination with the distance information (between garbage and the bottom surface of the dumpster lid). For example, at a dumpster, garbage may be 0.2 feet from the bottom surface of the lid; however, at other locations, garbage is 3 feet from the bottom surface of the lid. In addition, image 1 confirms that the dumpster has 80% available capacity. In embodiments, central server 208 may analyze image 1 against stored historical images of the dumpster when it is greater than 80% full. For example, central server 208 may have stored images of dumpster that are related to a particular fill capacity of the dumpster.

In this example, central server 208 may determine that dumpster UVI is 70% full. Based on the garbage truck information, central server 208 determines that garbage truck XYZ is closer than garbage truck ABC and has the capacity to pick up the garbage in dumpster UVI. In embodiments, central server 208 may also determine the financial costs (e.g., availability of crew, overtime costs, maintenance costs to the garbage truck, etc.) and determine that the financial cost to send truck XYZ to pick up the garbage in dumpster UVI is less than the financial cost to send truck ABC to go to dumpster UVI.

At step 1112, central server 208 sends the routing information to a routing system installed at a garbage truck. In embodiments, the routing information provides visual/audible electronic information to a garbage truck driver or passenger with where and when to pick up garbage from dumpster UVI.

FIG. 12 is an example database 1200. As shown in FIG. 12, database 1200 includes data fields of truck ID 1202, available capacity 1204, truck type 1206, number of pickups 1208, and location 1210. In embodiments, database 1200 may be part of central server 208, a part of sensor system 202, or a part of routing system 204. In embodiments, database 1200 may receive electronic information from routing system 204 or from other sources. For example, there may be multiple routing systems 204 that are communication with each other and share electronic information on garbage trucks and related information.

As shown in FIG. 12, truck ID 1202 may include multiple data fields with each data field storing information about different garbage trucks each with their identifier. In this example database, identifiers include D12, C31, and U98 are some of the stored identifiers. In addition, truck ID 1202 may also include information on the model of the garbage truck and the garbage truck's maximum capacity. As shown in FIG. 12, available capacity 1204 may include multiple data fields with each data field storing information about the available weight that the garbage truck has to pick up additional garbage. As shown in FIG. 12, available capacity may be given in tons but also can be stored using other measurement metrics (e.g., pounds, kilograms, cubic feet, etc.). As shown in FIG. 12, truck type 1206 may include multiple data fields with each data field storing information about the gas the type of garbage that the garbage truck is used to pick up. For example, "All" designation means that the garbage truck can pick up garbage from a general use dumpster.

As shown in FIG. 12, number of pickups 1208 may include multiple data fields with the number of pickups that have been conducted for a particular day (or other period of time). Alternatively, number of pickups 1208 may include information about the number of pickups scheduled for the day. For example, truck U98 has made eight pickups for the day. As shown in FIG. 12, location 1210 may include multiple data fields with the location of each garbage truck.

FIG. 13 is an example database 1300. As shown in FIG. 13, database 1300 includes data fields of dumpster ID 1302, dumpster size 1304, dumpster type 1306, location 1308, percent full 1310, and history 1312. In embodiments, database 1300 may be part of central server 208, a part of sensor system 202, or a part of routing system 204. In embodiments, database 1300 may receive electronic information from routing system 204 or from other sources. For example, there may be multiple routing systems 204 that are communication with each other and share electronic information on garbage trucks and related information.

As shown in FIG. 13, dumpster ID 1302 may include multiple data fields with identifiers for multiple dumpsters. As shown in FIG. 13, dumpster size 1304 may include multiple data fields with that store information about the size of a dumpster (for example, dumpster UY7 has a 1-ton capacity). As shown in FIG. 13, dumpster type 1306 may include multiple data fields about the garbage that can be stored in the dumpster. For example, BH7 is for recyclable items. As shown in FIG. 13, location 1308 may include multiple data fields with that store information about the location of a dumpster. In embodiments, location 1308 may also include electronic information about the types of customers that use the dumpster. For example, the dumpster may be used by a single retailer, the dumpster may be located at a multifamily housing development, the dumpster may be located at a shopping center, and/or any other type of customer. As shown in FIG. 13, percent full 1310 may include multiple data fields with that stored information about how full is a dumpster. In embodiments, database 1300 may include information about the proximity of dumpsters to residential areas and the importance of minimizing odor released to the area surrounding the dumpster. Thus, a dumpster with higher methane levels or a dumpster emitting foul odors, like sulfur, as detected by an odor sensor included in the sensor device may be given a greater priority than a dumpster with more garbage but located at an industrial site. Thus, past complaints about odors from a dumpster near a residential area may be used to determine that dumpster pickup from that dumpster is given greater priority for pickup.

FIG. 13 further shows history 1312 may include multiple data fields that include an identifier that may be related to data included in another database (either a part of database 1300 or another electronic database) that includes historical (e.g., past) electronic information about a particular dumpster. For example, as shown in FIG. 13, dumpster BH7 may have a data field nn89t which is an identifier to historical information about physical past garbage deposits into dumpster BH7. In embodiments, the historical information may be then be used by central server 208 (or any other computing device) to determine future garbage deposits at a particular dumpster and, hence, assist in determining a route for a garbage truck for a particular time period (e.g., for the hour, day, month, year, etc.).

For example, the historical data may include information that dumpster BH7 took a deposit between 3:15 pm and 3:30 pm on a Monday and that deposit took up 20% of the dumpster capacity. Thus, central server 208 may determine that the dumpster may not take any additional garbage after 3:30 pm on a Monday based on analyzing the last particular number of days (e.g., 100 days, 200 days, 1,000 days, etc.) and determining that within particular time periods (e.g., 15 minute windows, 30 minute windows, etc.). In embodiments, central server 208 may determine, based on historical information, that in only 10% of previous days was garbage placed into the dumpster and that this percentage does not exceed a threshold; and, thus, is a determination that garbage is not placed into the dumpster after 3:30 pm. In embodiments, central server 208 may also use the type of customer that uses a particular dumpster to determine future routing information. For example, central server 208 may determine that the time period between Thanksgiving and New Years Day results in a dumpster at a big box retail customer to be filled on a more frequent basis (e.g., filled to capacity every three days versus every six days) during this holiday time period. In addition, a data field in history 1312 may also include past historical imagery that central server 208 may use to determine future capacity of a dumpster and, hence, determine routing information for one or more garbage trucks.

Figure 14:
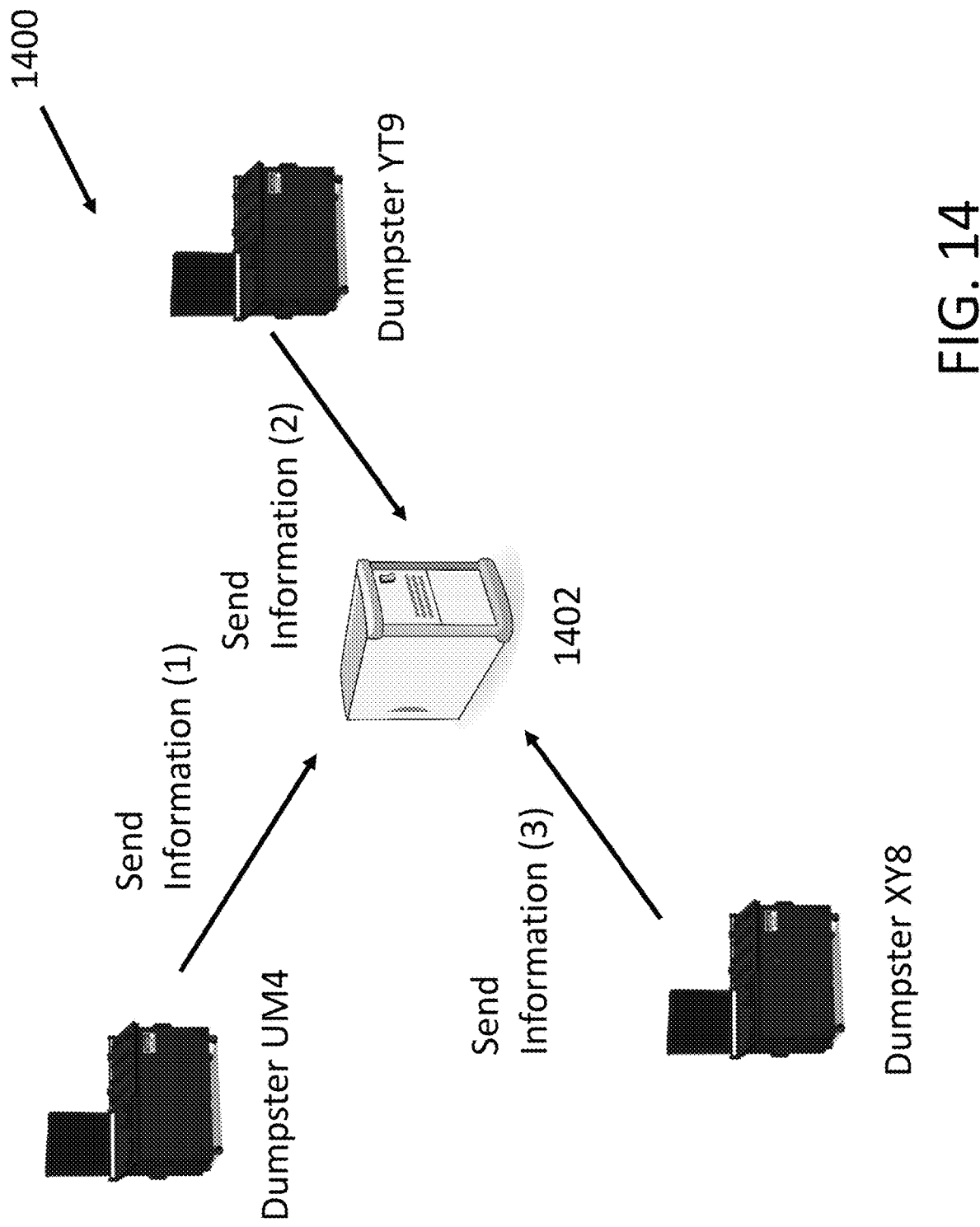
FIGS. 14-17 are diagrams of example processes for routing a garbage truck.

FIGS. 14 to 17 are example diagrams describing an example process for generating and communicating electronic routing information. FIG. 14 shows an example networking diagram 1400. As shown in FIG. 14, computer device 1402 (similar to central server 208) receives electronic information from example dumpsters UM4, YT9, and XY8 that is similar to the electronic information stored in the data fields in database 1300. In this example, each of the example dumpsters has a sensor system (similar to sensor system 202). In this non-limiting example, the sensor system at dumpster UM4 sends electronic information in communication (1) which includes information derived from an ultrasonic sensor that is part of the sensor system and also images from inside dumpster UM4. Similarly, the sensor systems in dumpsters YT9 and XY8 send electronic communications (2) and (3), respectively. In this non-limiting example, UM4 sends electronic information that it is a recyclable dumpster and is 80% full, YT9 sends electronic information that it is general use (i.e., "all") dumpster and is 50% full, and XY8 sends electronic information that is also a general-use dumpster and is 70% full.

Figure 15:
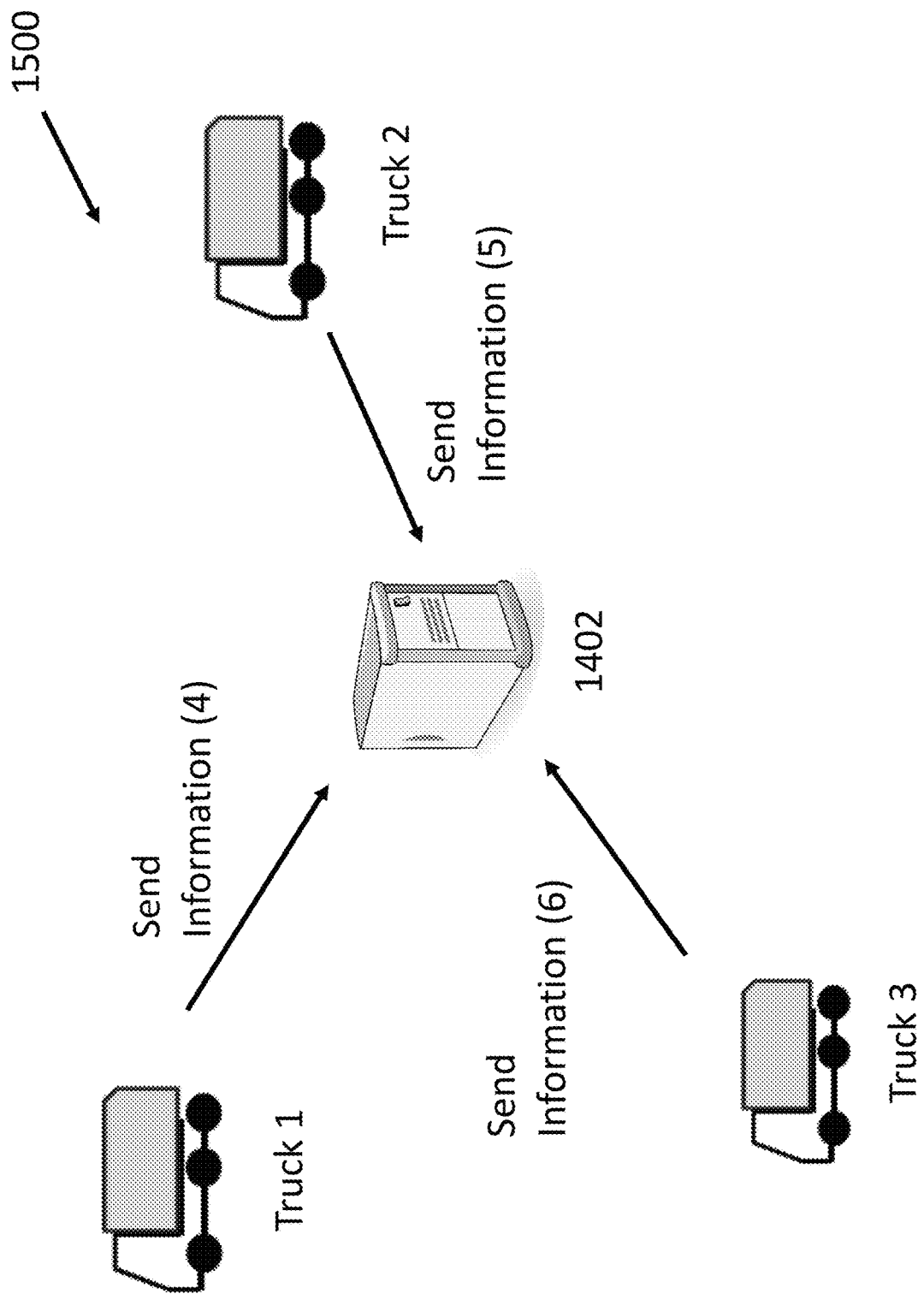

FIG. 15 shows an example networking diagram 1500. As shown in FIG. 15, computer device 1402 receives electronic information from routing systems (similar to routing system 204) attached to garbage trucks 1, 2, and 3. In this example, each routing system sends electronic information such as that described in database 1200. For example, garbage truck 1 sends electronic information that it is 80% full. Garbage truck 2 sends electronic information that it is 30% full. Garbage truck 3 sends electronic information that it is 10% full.

Figure 16:
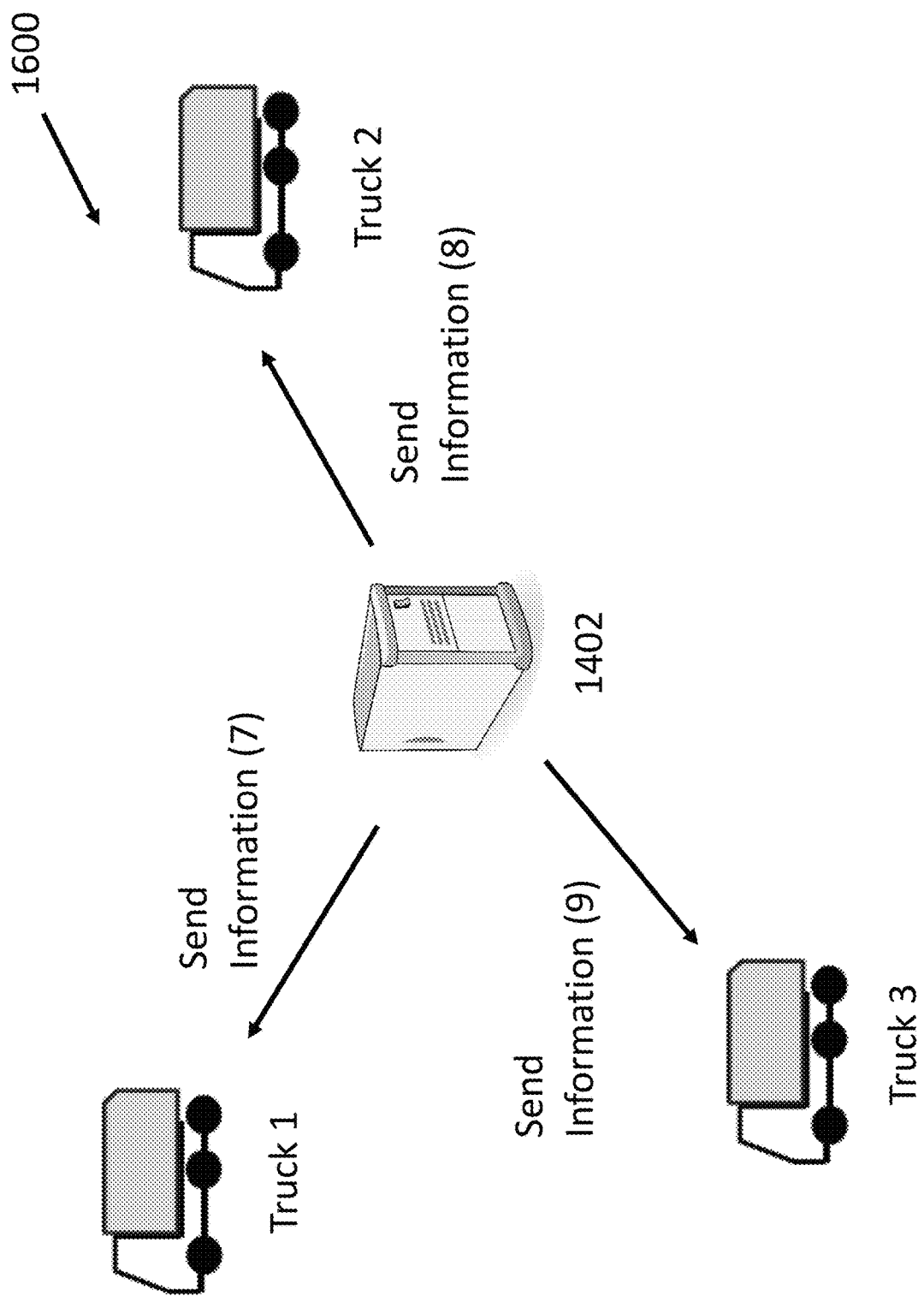

FIG. 16 shows an example networking diagram 1600. As shown in FIG. 16, computer device 1402 sends electronic information to garbage trucks 1, 2, and 3 via electronic communications (7), (8), and (9), respectively. Each electronic communication is sent based on the electronic information received from the dumpsters (as described in FIG. 14) and the garbage trucks (as described in FIG. 15). Also, computer device 1402 sends electronic information to garbage truck 1 that garbage truck 1 is to go the landfill. Furthermore, computer device 1402 sends electronic information to garbage truck 2 that it is to travel to dumpster XY8.

Figure 17:
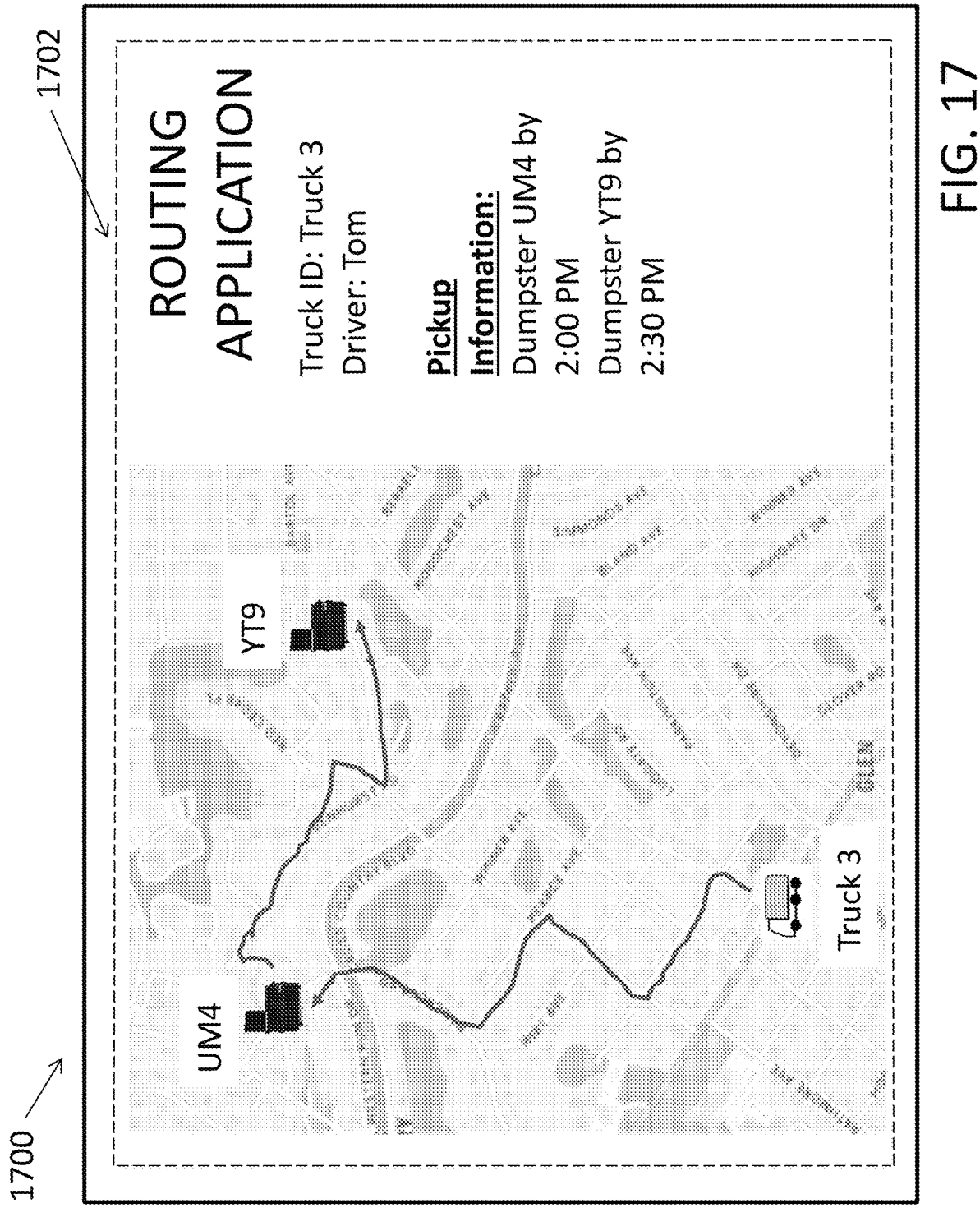

In this non-limiting example, based on the electronic information sent by the garbage trucks (via routing systems) and dumpsters (via sensor systems) to computer device 1402, computer device 1402 determines routing information to be sent to one or more garbage trucks. In embodiments, computer device 1402 may determine that garbage truck 3's location is closest and also has the greatest capacity to pick up the garbage from dumpster UM4 and YT9. In this non-limiting example, computer device 1402 determines that garbage truck 3 can pick up the garbage from dumpster UM4 and YT9. As shown in FIG. 17, routing device 1700 is shown with display 1702 (being a graphical user interface). As shown in display 1702, a map is displayed with a route and also locations of dumpster truck 3, and dumpsters UM4 and YT9. Also, as shown in display 1702, additional information is displayed which includes the driver's name, and also times by which garbage should be picked up from dumpsters UM4 and YT9. While FIG. 17 shows garbage truck 3 as being given two stops, in other examples, a garbage truck (such as garbage truck 3) may be given only its next dumpster location and then its next dumpster location is determined after the garbage is picked up at the first dumpster. Thus, display 1702 may only show garbage being picked up from dumpster UM4 and then display 1702 may display a new route to another dumpster (which may be dumpster YT9 or may be another dumpster).

The above-described examples may be implemented in many different forms of software, firmware, and hardware in the implementations illustrated in the figures. In embodiments, the actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Also, it will be understood that any of the various actions can result in any type of electronic information to be displayed in real-time and/or simultaneously on multiple devices. For FIGS. 10 and 11, the order of the blocks may be modified in other implementations. Further, non-dependent blocks may be performed in parallel. In FIGS. 7, 8, and 9, the pair of double lines shown at the end areas of the figures should be considered as hatch lines that are showing that FIGS. 7, 8, and 9 are showing portions of a solar and battery system, a dumpster lid, and a sensor system. In the preceding specification, the systems and devices described in FIGS. 1-17 may send electronic information between each other simultaneously (e.g., such as multiple sensor systems 202 on multiple dumpsters sending electronic information to central server 208). Also, in the preceding specification, the systems and devices described in FIGS. 1-17 may generate electronic information automatically such that the systems and devices provide for a system that reduces computing and other physical costs (e.g., fuel, work hours, etc.) associated with routing garbage trucks to dumpsters located in different geographic locations. Also, in the preceding specification, portions of the power system 702 (not including solar panels) and sensor system 706 may be manufactured out of plastic, metal, or any other material. Also, in the preceding specification, solar panels may be manufactured of any material that permits for the solar panels to obtain rays from the sun and be used to convert such rays into power.

In the preceding specification, while garbage trucks are used to pick up garbage, other types of vehicles may also be used to pick up garbage, such as pickup trucks, cars, motorcycles, etc., depending on municipality, country, and other. In the preceding specification, garbage trucks may be driven by a person or the garbage trucks may be automated and the routing system described above can also send electronic communications to an automated driving system of the garbage truck. In the preceding specification, while dumpster lids are shown on the top, the dumpster lid may be attached to the side of a dumpster or on multiple sides of a dumpster.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A garbage pickup routing system, comprising:
a dumpster with a dumpster lid;
solar panels;
a battery system, wherein a top surface of the battery system attaches to a bottom surface of the solar panels, and
  wherein a bottom surface of the battery system has blocks that are configured to fit through apertures within the grooves of the dumpster lid;
a sensor system, wherein the sensor system is configured to attach to a bottom surface of the dumpster lid,
  wherein a top surface of the sensor system has a corrugated design that fits into the bottom surface of the dumpster lid, and
  wherein the battery system is configured to send power to the sensor system;
a camera, wherein the camera is configured to automatically take one or more images that are taken at particular time intervals;
a first computing device and a computer database with electronic historical information;
a second computing device, wherein the second computing device is configured to:
  generate and send electronic dumpster capacity information to the first computing device,
  wherein the electronic dumpster capacity information includes:
    a dumpster location,
    the one or more electronic images from the camera, and
    electronic distance information about a distance between a top surface of garbage within a dumpster and a bottom surface of the sensor system;
a routing system, wherein the routing system is attached to a garbage truck;
a garbage truck sensor, wherein the garbage truck sensor is configured to send truck electronic capacity information to the routing system,
and wherein the routing system is configured to send the electronic truck capacity information and garbage truck location to the first computing device,
  wherein the first computing device is configured to:
    receive the electronic truck capacity information and the electronic dumpster capacity information,
    simultaneously receive additional electronic dumpster capacity information from another dumpster,
    analyze the electronic truck capacity information, the electronic dumpster capacity information, the additional electronic dumpster capacity information, the dumpster location, and the truck location, and
    determine a particular route of the garbage truck based on the analysis of the electronic truck capacity information and the electronic dumpster capacity information, the additional electronic dumpster capacity information, the garbage truck location, and the dumpster location.

2. The garbage pickup routing system of claim 1, wherein the sensor system further includes an odor sensor, and wherein:
  the odor sensor is configured to determine a concentration of methane gas inside the garbage dumpster;
  the second computing device is configured to generate electronic methane gas information based on the concentration of methane gas inside the dumpster;
  the first computing device is configured to:
    receive the electronic methane gas information,
    analyze the electronic methane gas information,
    determine a different route for the dumpster truck based on the analyzing the electronic methane gas information, the dumpster location, and electronic historical information about particular concentrations of methane gas inside the dumpster.

3. The system of claim 1, wherein the sensor system includes a motion sensor, and wherein:
  the motion sensor is configured to detection particular time intervals between when the dumpster lid is opened and closed,
  the second computing device is configured to generate electronic open and close information which is sent to the first computing device,
  the first computing device is configured to determine another route based on the electronic open and close information and the electronic dumpster capacity information.

4. The system of claim 3, wherein the camera is configured to take electronic images at a first particular time and the sensor system obtains the electronic distance information at a second particular time, wherein the first particular time and the second particular time are not the same.

5. The system of claim 4, wherein the electronic open and close electronic information is obtained at a third particular time, wherein the third particular time is not the same as the first particular time.

6. The system of claim 1, wherein the first computing device is further configured to:
  analyze the electronic historical information about previous garbage pickups that occurred at a particular time for an additional dumpster,
  determine a new garbage truck route based on the electronic historical information, and
  send an electronic communication to the routing system that the dumpster truck is to go the other dumpster.

7. A method comprising:
attaching solar panels to a top surface of a battery system, wherein the battery system is mounted on top of a dumpster lid that is part of a dumpster;
  wherein a bottom surface of the battery system has blocks that are configured to fit within grooves of the dumpster lid;
attaching a sensor system to the bottom surface of the dumpster lid, wherein a top surface of the sensor system has a corrugated design that fits into the bottom surface of the dumpster lid;
generating, by the sensor system, electronic distance information, wherein the electronic distance information is about a distance between a top surface of garbage within a dumpster and a bottom surface of the sensor system and sending, by the computing device, the electronic distance information to another computing device;

taking, by a camera; electronic images of the dumpster interior, wherein the electronic images are taken at particular time intervals which occur automatically;

sending, by the computing device, the electronic images to the other computing device;

sending, by the computing device, electronic dumpster capacity information to the other computing device;

sending, by the computing device, dumpster location;

determining, by a garbage truck sensor system, a garbage truck capacity;

sending, by a routing system, based on the garbage truck capacity, electronic truck capacity information to the other computing device;

sending, by the routing system, garbage truck location to the other computing device;

analyzing, by the other computing device, the truck capacity electronic information and the dumpster capacity electronic information, the dumpster location, and the garbage truck location, simultaneously receiving, by the other computing device, additional electronic dumpster capacity information from another dumpster determining, by the other computing device, a first particular route of the garbage truck based on the analysis of the truck capacity electronic information, the dumpster capacity electronic information, the additional electronic dumpster capacity information, the garbage truck location, and the dumpster location.

8. The method of claim 7, wherein the sensor system is configured to receive the distance information when a dumpster lid is opened.

9. The method of claim 7, wherein the routing information is electronically displayed on a mobile device.

10. The method of claim 7, wherein the computing device further generates the routing information based on previous garbage pickups from the dumpster.

11. The method of claim 7, wherein the sensor system includes a methane sensor.

12. The method of claim 7, wherein the sensor system includes an odor sensor.

* * * * *